(12) United States Patent
Zhou et al.

(10) Patent No.: US 11,295,517 B2
(45) Date of Patent: Apr. 5, 2022

(54) GENERATING REALISTIC POINT CLOUDS

(71) Applicant: Waymo LLC, Mountain View, CA (US)

(72) Inventors: Yin Zhou, San Jose, CA (US); Dragomir Anguelov, San Francisco, CA (US); Zhangjie Cao, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/099,589

(22) Filed: Nov. 16, 2020

(65) Prior Publication Data

US 2021/0150807 A1 May 20, 2021

Related U.S. Application Data

(60) Provisional application No. 62/936,324, filed on Nov. 15, 2019.

(51) Int. Cl.
*G06T 17/00* (2006.01)
*G06N 20/00* (2019.01)
*G06K 9/00* (2022.01)
*G06N 3/04* (2006.01)

(52) U.S. Cl.
CPC .......... *G06T 17/00* (2013.01); *G06K 9/00664* (2013.01); *G06N 3/0454* (2013.01); *G06N 20/00* (2019.01)

(58) Field of Classification Search
CPC ..... G06T 17/00; G06T 19/20; G06T 2210/56; G06K 9/00664; G06K 2209/40; G06K 9/00791; G06N 3/0454; G06N 20/00; G06N 3/0472; G06N 3/084
See application file for complete search history.

(56) References Cited

U.S. PATENT DOCUMENTS

| 2018/0268256 A1* | 9/2018 | Di Febbo | G06K 9/6273 |
| 2019/0172238 A1* | 6/2019 | Miao | G06T 7/11 |
| 2019/0311487 A1* | 10/2019 | Xiao | G06T 17/05 |
| 2020/0371238 A9* | 11/2020 | Day | G01S 7/4815 |

(Continued)

OTHER PUBLICATIONS

Abadi et al., "Tensorflow: A system for large-scale machine learning," 12th symposium on operating systems design and implementation, 2016, pp. 265-283.

(Continued)

*Primary Examiner* — Maurice L. McDowell, Jr.
(74) *Attorney, Agent, or Firm* — Fish & Richardson P.C.

(57) ABSTRACT

Methods, systems, and apparatus, including computer programs encoded on computer storage media, for generating realistic full-scene point clouds. One of the methods includes obtaining an initial scene point cloud characterizing an initial scene in an environment; obtaining, for each of one or more objects, an object point cloud that characterizes the object; and processing a first input comprising the initial scene point cloud and the one or more object point clouds using a first neural network that is configured to process the first input to generate a final scene point cloud that characterizes a transformed scene that has the one or more objects added to the initial scene.

54 Claims, 12 Drawing Sheets

(56) References Cited

U.S. PATENT DOCUMENTS

2021/0042964 A1* 2/2021 Yeung ............... H04N 19/184

OTHER PUBLICATIONS

Achlioptas et al., "Learning Representations and Generative Models for 3D Point Clouds," Proceedings of the 35th International Conference on Machine Learning, 2018, 80:40-49.
Arjovsky et al., "Wasserstein gan," CoRR, Jan. 2017, arXiv:1701.07875, 32 pages.
Bolte et al., "Towards corner case detection for autonomous driving," 2019 IEEE Intelligent Vehicles Symposium, Jun. 2019, 9 pages.
Brock et al., "Large scale gan training for high fidelity natural image svnthesis," CoRR, Sep. 2018, arXiv:1809.11096, 35 pages.
Caccia et al., "Deep generative modeling of lidar data," 2019 IEEE/RSJ International Conference on Intelligent Robots and Systems, Nov. 2019, 7 pages.
Chen et al., "3d object proposals for accurate object class detection," Advances in Neural Information Processing Systems, 2015, pp. 424-432.
Chen et al., "Deepdriving: Learning affordance for direct perception in autonomous driving," Proceedings of the IEEE International Conference on Computer Vision, 2015, pp. 2722-2730.
Chen et al., "Monocular 3d object detection for autonomous driving," Proceedings of the IEEE Conference on Computer Vision and Pattern Recognition, 2016, pp. 2147-2156.
Dai et al., "Shape completion using 3d-encoder-predictor cnns and shape synthesis," Proceedings of the IEEE Conference on Computer Vision and Pattern Recognition, 2017, pp. 5868-5877.
Fan et al., "A point set generation network for 3d object reconstruction from a single image," Proceedings of the IEEE conference on computer vision and pattern recognition, 2017, pp. 605-613.
Fang et al., "Simulating LIDAR point cloud for autonomous driving using real-world scenes and traffic flows," CoRR, arXiv preprint arXiv:1811.07112, 2018:1.
Geiger et al., "Vision meets robotics: The kitti dataset," International Journal of Robotics Research, Aug. 2013, 32(11):1231-7.
Goodfellow et al., "Generative adversarial nets," CoRR, Jun. 2014, arxiv.org/abs/1406.2661, 9 pages.
Groueix et al., "Atlasnet: A papier-mache approach to learning 3D surface generation," CoRR. Feb. 2018, arXiv:1802.05384, 16 pages.
Gulrajani et al., "Improved framing of wasserstein gans." CoRR, Mar. 2017, arxiv.org/abs/1704.00028, 20 pages.
Huber, "Robust estimation of a location parameter," Breakthroughs in Statistics, 1992, pp. 492-518.
Lang et al., "Pointpillars: Fast encoders for object detection from point clouds," Proceedings of the IEEE Conference on Computer Vision and Pattern Recognition, 2019, pp. 12697-12705.
Lee et al., "Inserting videos into videos," Proceedings of the IEEE/CVF Conference on Computer Vision and Pattern Recognition, Jun. 2019, pp. 10061-10070.
Li et al., "Vehicle detection from 3D lidar using fully convolutional network," CoRR, Aug. 2016, arXiv:1608.07916, 8 pages.
Lim et al., "Geometric GAN," CoRR, May 2017, arXiv:1705.02894, 17 pages.
Lin et al., "Focal loss for dense object detection," Proceedings of the IEEE international conference on computer vision, 2017, pp. 2980-2988.
Meng et al., "VV-net: Voxel vae net with group convolutions for point cloud segmentation," CoRR, Nov. 2018, arXiv:1811.04337, 9 pages.
Mirza et al., "Conditional generative adversarial nets," CoRR, Nov. 2014, arXiv:1411.1784, 7 pages.
O'Kelly et al., "Scalable end-to-end autonomous vehicle testing via rare-event simulation," CoRR, Oct. 2018, arxiv.org/abs/1811.00145, 18 pages.
Odena et al., "Conditional image synthesis with auxiliary classifier gans," Proceedings of the 34th International Conference on Machine Learning, 2017, 70:2642-2651.
Ondruska et al., "End-to-end tracking and semantic segmentation using recurrent neural networks," CoRR, Apr. 2016, arXiv:1604.05091, 9 pages.
Qi et al., "Pointnet: Deep learning on point sets for 3d classification and segmentation," Proceedings of the IEEE Conference on Computer Vision and Pattern Recognition, 2017, pp. 652-660.
Radford et al., "Unsupervised Representation Learning with Deep Convolutional Generative Adversarial Networks," CoRR, Nov. 2015, arxiv.org/abs/1511.06434, 16 pages.
Remelli et al., "Neuralsampler: Euclidean point cloud auto-encoder and sampler," CoRR, Jan. 2019, arXiv:1901.09394, 9 pages.
Salimans et al., "Improving gans using optimal transport," CoRR, Mar. 2018, arXiv:1803.05573, 13 pages.
Stutz et al., "Learning 3D shape completion from laser scan data with weak supervision," Proceedings of the IEEE Conference on Computer Vision and Pattern Recognition, 2018, pp. 1955-1964.
Sung et al., "Data-driven structural priors for shape completion," ACM Transactions on Graphics, Oct. 2015, 34(6):175.
Tomasello et al., "DSCnet: Replicating lidar point clouds with deep sensor cloning," Proceedings of the IEEE Conference on Computer Vision and Pattern Recognition Workshops, 2019, 9 pages.
Wang et al., "Pseudo-lidar from visual depth estimation: Bridging the gap in 3d object detection for autonomous driving," Proceedings of the IEEE Conference on Computer Vision and Pattern Recognition, 2019, pp. 8445-8453.
Xu et al., "Multi-level fusion based 3D object detection from monocular images," Proceedings of the IEEE Conference on Computer Vision and Pattern Recognition, 2018, pp. 2345-2353.
Yin et al., "Morfit: interactive surface reconstruction from incomplete point clouds with curve driven topology and geometry control," ACM Trans. Graph., Nov. 2014, 33(6):202-1.
Yuan et al., "Pen: Point completion network," 2018 International Conference on 3D Vision, Sep. 2018, pp. 728-737.
Zhou et al., "End-to-End Multi-View Fusion for 3D Object Detection in LiDAR Point Clouds," 3rd Conference on Robot Learning, 2019, 10 pages.
Zhou et al., "Voxelnet: End-to-end learning for point cloud based 3D object detection," Proceedings of the IEEE Conference on Computer Vision and Pattern Recognition, 2018, pp. 4490-4499.

* cited by examiner

GENERATING REALISTIC POINT CLOUDS

CROSS-REFERENCE TO RELATED APPLICATION

This application claims priority to U.S. Application Ser. No. 62/936,324, filed Nov. 15, 2019, the entirety of which is hereby incorporated by reference.

BACKGROUND

This specification relates to generating point clouds that represent scenes in an environment, e.g., scenes in the vicinity of an autonomous vehicle.

This specification also relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values. Once a neural network is trained, the final set of parameter values can be used to make predictions in a production system.

SUMMARY

This specification describes how a computer system can insert an object point cloud into an initial scene point cloud to generate a final scene point cloud. The final scene point cloud is generated by a machine learning model referred to in this specification as a "scene generator neural network." That is, given a point cloud that represents an object, e.g., a vehicle, and a point cloud that represents an environment, e.g., an intersection, the output of the scene generator neural network is a point cloud that represents the environment with the object inserted into it, e.g., the vehicle stopped at the intersection.

This specification also describes how a computer system can train the scene generator neural network using an adversarial scene discriminator neural network. Once the scene generator neural network has been trained, the scene generator neural network can generate full-scene point clouds that can be used to train autonomous vehicle agents.

Particular embodiments of the subject matter described in this specification can be implemented so as to realize one or more of the following advantages.

Using the methods described in this specification, a system can generate a scene point cloud that characterizes an environment with a desired object inserted into the environment. The generated scene point cloud appears realistic, i.e., appears as if it has been generated using sensor data captured by one or more sensors in the real world. The generated scene point cloud can then be used by a training system as a training input to a machine learning model that is to be deployed onto an autonomous vehicle, i.e., provided to the machine learning model as if the autonomous vehicle were in the environment represented by the scene point cloud.

It is important for the scene point cloud to accurately represent a point cloud that might be captured by sensors on-board an autonomous vehicle operating in the real world; that is, the scene point cloud should come from the same distribution (or a very similar distribution) as point clouds generated from sensor data captured by sensors on-board an autonomous vehicle. Otherwise, the machine learning model will be trained using training data drawn from a different distribution than the input data that will be provided to the machine learning model at inference; this may cause the machine learning model not to be adequately trained to react to real-world situations.

As a particular example, typically a point cloud generated from sensor data captured by on-board sensors has a particular density of points. In some implementations, the density of points is not uniform; for example, the density can depend on the distance of the point from the on-board sensors. In some such implementations, this dependence is not a linear function of the distance from the on-board sensors, but rather follows some other pattern that is not easily determined, e.g., a sinusoidal or quasi-sinusoidal pattern. However, the object point cloud that is to be inserted into the scene point cloud typically does not have the same density as a point cloud generated from real-world sensor data; for example, the object point cloud can have a much higher density of points. Using techniques described in this specification, a system can insert an object point cloud into an initial scene point cloud to generate a final scene point cloud that has a realistic density of points, even when the density of the object point cloud and/or the initial scene point cloud was not realistic.

Machine learning models used in the operation of autonomous vehicles are often trained using training examples gathered by vehicles operating in the real world. This means that machine learning models that receive point cloud data as input are often limited to being trained on point clouds characterizing scenarios that real-world vehicles have experienced. Thus, the models might not be exposed to scenarios that are very uncommon in the real world, because there might be very few or no training examples characterizing these uncommon scenarios. If the uncommon scenario is a potentially very dangerous one, then the machine learning model will not learn how to react to the dangerous situation when it is deployed on vehicles in the real world.

A scene generator neural network, as described in this specification, can be used to create full-scene point clouds of these uncommon but dangerous scenarios. These full-scene point clouds can be used by training systems for training the machine learning models to react properly to such scenarios.

For example, it is very uncommon to see a couch lying in the middle of a road, e.g., a couch that fell off the back of a truck. It is therefore likely that training data for modeling this scenario is very sparse. If a human driver sees a couch lying in the road, the human driver would recognize it and react accordingly. However, if a machine learning model operating an autonomous vehicle was never exposed to such a scenario during training (or was very rarely exposed to such a scenario during training), then the machine learning model might not recognize the object and might not react properly. A scene generator neural network, as described in this specification, can solve this problem by processing i) an initial scene point cloud representing a road and ii) an object point cloud representing a couch, to generate a final scene point cloud that characterizes the couch lying in the road. This final scene point cloud can then be used to expose machine learning models used in the operation of autonomous vehicles to such a scenario during training.

Using techniques described in this specification, a system can generate new object point clouds using existing object point clouds, e.g., by processing the existing object point clouds using an object generator neural network. The new object point clouds characterize the same object as the existing object point clouds, but are slightly different yet still realistic. These new object point clouds can be inserted into initial scene point clouds by a scene generator neural network, as described above, to generate training examples for machine learning models used in the operation of autonomous vehicles. Thus, the machine learning models can be exposed to training data that includes small variations in the point cloud representations of objects, e.g., training data that includes multiple training examples that represent different couches lying in the middle of a road (corresponding to different new "couch" object point clouds generated from the same initial "couch" object point cloud). Thus, scene generator neural networks and object generator neural networks can together significantly augment a training set of point clouds, improving the performance of the trained machine learning models.

In some implementations described in this specification, a scene generator neural network can be trained in an adversarial manner using a scene discriminator neural network that predicts whether a given final scene point cloud is real or synthetic. Adversarial training can help the scene generator neural network to generate final scene point clouds that are more and more realistic, by incentivizing the generation of final scene point clouds that "fool" the scene discriminator neural network, i.e., that cause the scene discriminator to inaccurately predict whether the final point cloud is real or synthetic. This allows the machine learning models being trained using the final scene point clouds to be exposed to point clouds that appear to have been gathered by sensors on-board a real vehicle. The machine learning models being trained are therefore more prepared for uncommon and dangerous scenarios after deployment, when they will receive point clouds that have actually been gathered on-board the vehicle.

Using techniques described in this specification, a system can also modify an original point cloud to generate realistic and diverse new point clouds that represent the same environment. That is, the system does not insert point cloud representations of new objects into the original point cloud as described above, but rather perturbs the positioning of the points in the original point cloud to generate the new point clouds. The system can augment a training data set using the realistic new point clouds, improving training of machine learning models by adding more diversity in the training data set.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a trained machine learning model, referred to in this specification as a "scene generator neural network," can insert an object point cloud into an initial scene point cloud to generate a new scene point cloud. This specification also describes how a computer system can train the scene generator neural network using an adversarial scene discriminator neural network. This specification also describes how a trained machine learning model, referred to in this specification as an "object generator neural network," can generate new object point clouds from an original object point cloud, and how the object generator neural network can be trained using an adversarial object discriminator neural network.

A point cloud is a collection of data points defined by a given coordinate system. For example, in a three-dimensional coordinate system, a point cloud can define the shape of some real or synthetic physical system, where each point in the point cloud is defined by three values representing respective coordinates in the coordinate system. As another example, in a three-dimensional coordinate system, each point in the point cloud can be defined by four values, wherein three values represent coordinates in the coordinate system and the fourth value represents an intensity of the point in the point cloud. In this specification, for convenience, a "point cloud" will refer to a three-dimensional point cloud, i.e., the location of each point in a three-dimensional coordinate system is defined by three values, but in general a point cloud can have a different dimensionality, e.g. four-dimensional or two-dimensional. In this specification, a "scene point cloud" will refer to a point cloud that characterizes an environment in three-dimensional space, where the environment can include one or more objects; e.g., a scene point cloud can characterize an intersection that includes a stop sign and a pedestrian. In this specification, an "object point cloud" will refer to a point cloud that characterizes a single object in three-dimensional space, e.g., a vehicle.

Figure 1:
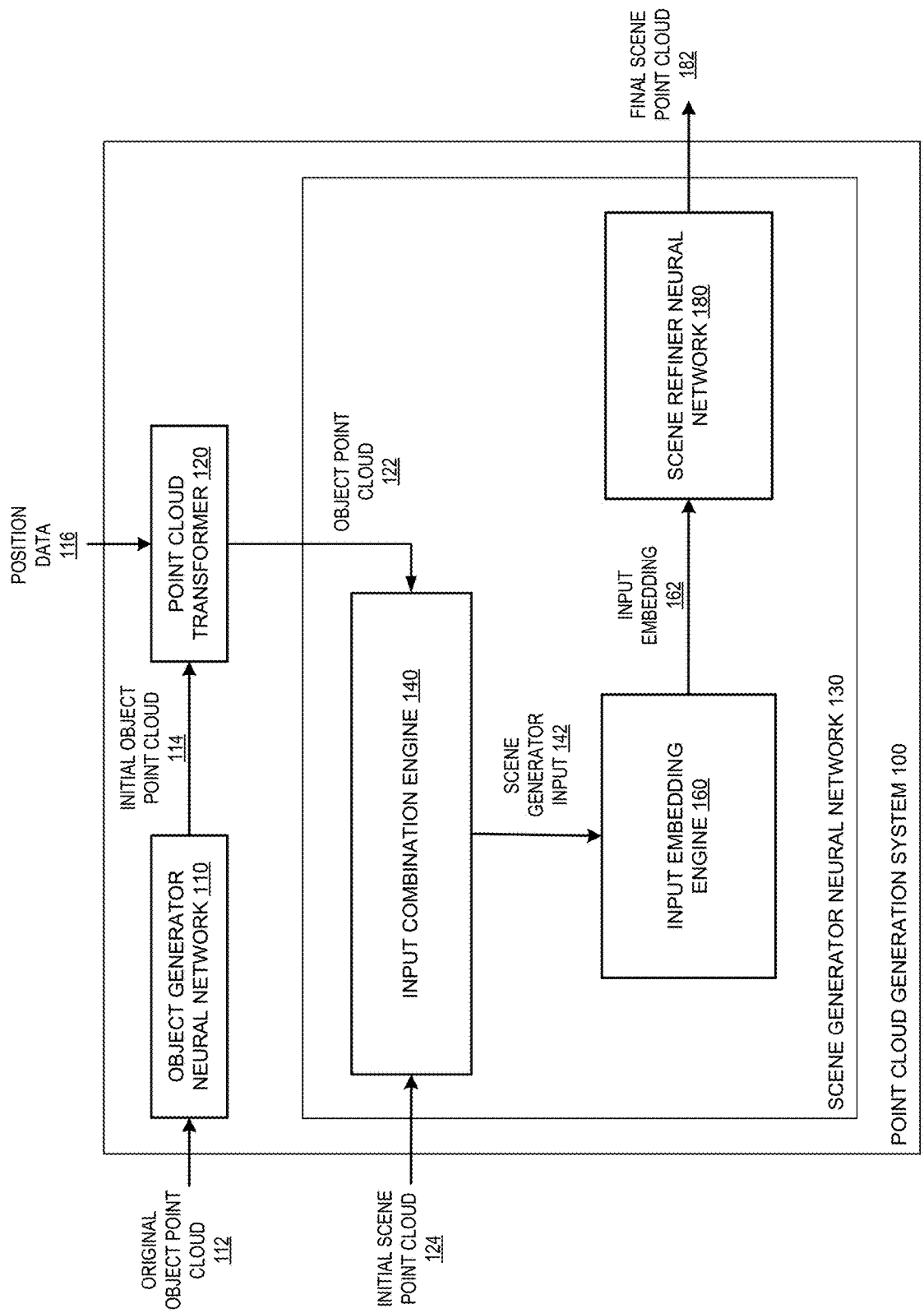
FIG. 1 shows an example point cloud generation system.

FIG. 1 shows an example point cloud generation system 100. The point cloud generation system 100 is an example of a system implemented as computer programs on one or more computers in one or more locations in which the systems, components, and techniques described below are implemented.

The point cloud generation system takes as input an original object point cloud 112, which characterizes an object, and an initial scene point cloud 124, which characterizes a scene in an environment, and outputs a final scene point cloud 182, which characterizes the same scene in the environment but with the object inserted into the environment. The point cloud generation system 100 also uses position data 116, which characterizes a desired pose and desired location in the environment of the object, to insert the object into the environment.

The point cloud generation system 100 includes an object generator neural network 110, a point cloud transformer 120, and a scene generator neural network 130.

The point cloud generation system 100 receives the original object point cloud 112 and provides it to the object generator neural network 110 as input.

The object generator neural network 110 processes the original object point cloud 112 to generate an initial object point cloud 114. The initial object point cloud 114 is different from the original object point cloud 112; e.g., there can be small variations in the positioning of the points in the initial object point cloud 114 compared to the original object point cloud 112. However, the initial object point cloud 114 characterizes the same object as the original object point cloud 112. In other words, the initial object point cloud 114 appears to be drawn from the same data distribution as the original object point cloud 112.

As a particular example, the object generator neural network 110 can take as input a point cloud that contains N points, where the point cloud is represented as an N×3 matrix, where each row of the matrix contains the coordinates of a respective point in a three-dimensional coordinate system. The network can process this matrix using one or more one-dimensional convolutional layers and activation layers (e.g., ReLU layers), followed by a max-pooling layer that produces a k-dimensional vector that encodes information extracted from the input matrix. The network can then process the k-dimensional vector using one or more fully-connected layers to produce an output that is also an N×3 matrix, i.e., the same dimensionality as the input.

In some implementations, the object generator neural network 110 is trained adversarially with an object discriminator neural network. An example training system for an object generator neural network is described below with reference to FIG. 3A.

In some implementations, the point cloud generation system 100 does not include an object generator neural network, and so the initial object point cloud 114 is the same as the original object point cloud 112. In other words, the original object point cloud 112 is not processed before the system provides it as input to the point cloud transformer 120.

The point cloud transformer 120 is configured to receive i) the initial object point cloud 114 and ii) the position data 116. The position data 116 characterizes a desired location and pose of the object represented by the initial object point cloud 114 in the environment characterized by the initial scene point cloud 124. For example, the position data 116 can include a point in a coordinate system of the initial scene point cloud 124, where the point represents the center of the desired location of the object represented by the initial object point cloud 114. Instead or in addition, the position data 116 can include data characterizing a desired orientation of the object represented by the initial object point cloud 114, e.g., a three-dimensional orientation representing a desired pitch, yaw, and roll in the coordinate system of the initial scene point cloud 124. Instead or in addition, the position data 116 can include data representing a three-dimensional bounding box in the coordinate system of the initial scene point cloud 124. The bounding box can bound the desired position of the object represented by the initial object point cloud in the environment characterized by the initial scene point cloud 124. For example, the bounding box can be represented by i) a 3×3 rotation matrix representing the orientation of the initial object point cloud 114 in the coordinate system of the initial scene point cloud 124 and ii) a 3×1 translation matrix representing the location of the initial object point cloud 114 in the coordinate system of the initial scene point cloud 124.

The point cloud transformer 120 generates an object point cloud 122 that characterizes the object with the desired location and pose. This process is described in more detail below in reference to FIG. 6.

The scene generator neural network 130 takes as input the object point cloud 122 and the initial scene point cloud 124, and outputs the final scene point cloud 182. An example process for generating a final scene point cloud is described in more detail below in reference to FIG. 5.

In some implementations, the scene generator neural network 130 is trained adversarially with a scene discriminator neural network. An example training system for a scene generator neural network is described below in reference to FIG. 3B.

The scene generator neural network 130 includes an input combination engine 140, an input embedding engine 160, and a scene refiner neural network 180.

The input combination engine 140 takes as input the object point cloud 122 and the initial scene point cloud 124 and combines them to produce a scene generator input 142. In some implementations, the input combination engine 140 concatenates the initial scene point cloud 124 and the object point cloud 122 to generate the scene generator input 142. In other words, because a point cloud can be represented as a matrix of coordinates, where each row of the matrix contains the coordinates of a different respective point, the input combination engine 140 can concatenate the matrix of coordinates of the initial scene point cloud 124 and the matrix of coordinates of the object point cloud 122 to create a matrix of coordinates that is the scene generator input 142.

In some implementations, the input combination engine 140 can process the scene generator input 142 using a physical model to update the scene generator input 142 to be more realistic.

For example, the physical model can filter out multiple points in the scene generator input 142 so that an occlusion pattern of the object point cloud 122 matches an occlusion pattern of the initial scene point cloud 124. In this specification, an occlusion pattern is a pattern of points in a point cloud representing an environment, where the pattern reflects the occlusion of one or more first objects in the environment from the sensors that captured the point cloud, where the occlusion is caused by one or more second objects. That is, the one or more second objects blocked the one or more first objects from the view of the sensors, so that at least a portion of each of the first objects are not represented by points in the point cloud.

As a particular example, the physical model can process the initial scene point cloud 124 to determine the occlusion pattern. Then, the physical model can process the object point cloud 122 and determine, using i) the position of the object point cloud 122 in the scene represented by the initial scene point cloud 124 (i.e., the position represented by the position data 116) and ii) the determined occlusion pattern, multiple points of the object point cloud 122 to remove or change in order to match the occlusion pattern of the initial scene point cloud 124.

In some implementations, the output of the physical model can be used by a supervised training system when training the input embedding engine 160 and/or the scene refiner neural network 180. In particular, the supervised training system can use the output of the physical model as the "target output" of the scene generator neural network 130, i.e., the output that should be generated by the scene generator neural network 130 in response to processing the scene generator input 142. This process is discussed in more detail below.

In some implementations, the input combination engine 140 can add one or more elements to the representation of each point in scene generator input, corresponding to each point in the initial scene point cloud 124 and the object point cloud 122. For example, the input combination engine 140 can add elements representing the position data 116 to each point in the object point cloud 122, and pad each point in the initial scene point cloud 124 with zeros to match the dimensionality of the points in the object point cloud 122. As a particular example, if the position data 116 is represented by a 3×3 rotation matrix and a 3×1 translation matrix, then the input combination engine 140 can append the 9 elements of the rotation matrix and the 3 elements of the translation matrix to each point in the object point cloud 122, and append 12 'zero' elements to each point in the initial scene point cloud 124.

In some implementations, the object point cloud 122 replaces one or more points of the initial scene point cloud 124 that are in the region within the initial scene point cloud 124 identified in the position data 116. That is, the input combination engine 140 can remove the one or more points that are to be replaced from the initial scene point cloud 124, and insert the points of the object point cloud 122. As a particular example, the object point cloud 122 might represent a parked vehicle, and might replace points in the initial scene point cloud 124 representing a pedestrian crossing the street at the location in the environment that the parked vehicle is to be parked.

The input embedding engine 160 is configured to receive the scene generator input 142 and to process the scene generator input 142 to generate an input embedding 162 that is an embedding of the scene generator input 142. In this specification, an embedding is an ordered collection of numeric values that represents an input in a particular embedding space. For example, an embedding can be a vector of floating point or other numeric values that has a fixed dimensionality.

In some implementations, the input embedding engine 160 generates the input embedding 162 by processing the scene generator input 142 using one or more view neural networks. In these implementations, the input embedding 162 includes a respective embedding of each point represented in the scene generator input 142. View neural networks, and an example input embedding engine that includes view neural networks, are described in more detail below with respect to FIG. 4.

In some other implementations, the input embedding 162 is a two-dimensional embedding that includes a respective embedding for each of multiple predetermined (x,y) locations in the environment represented by the initial scene point cloud 124.

In some such implementations, the input embedding engine 160 divides the environment into multiple three-dimensional voxels, where each voxel represents a volume of space in the environment. The input embedding engine 160 can then assign each point represented by the scene generator input 142 to the voxel that the point is in. Then, for each point i represented as $(x_i, y_i, z_i, f_i)$ in the scene generator input 142, where $(x_i, y_i, z_i)$ is the location of the point in the environment and $f_i$ is optional additional information (e.g., an intensity value and/or the 12 additional elements described above), the input embedding engine 160 can determine an updated representation for the point i to be: $(x_i, y_i, z_i, c_x, c_y, c_z, x_i-m_x, y_i-m_y, z_i-m_z, f_i)$, where $(c_x, c_y, c_z)$ is the location of the center of the voxel to which the point i is assigned, and where $(m_x, m_y, m_z)$ is the mean location of the points in the voxel. In some implementations, the updated representation of each point i can include a subset of the elements listed above, e.g., the updated representation can include $(c_x, c_y, c_z)$ but not $(x_i-m_x, y_i-m_y, z_i-m_z)$. In some implementations, the updated representation of each point i can include additional elements not listed above.

The input embedding engine 160 can determine a voxel embedding for each voxel using the respective updated representations of the points assigned to the voxel. For example, for each voxel, the input embedding engine 160 can determine the voxel embedding by processing the updated representations of the points assigned to the voxel using one or more convolutional neural networks layers. In some implementations, the output of the one or more convolutional neural network layers is the voxel embedding for the voxel. In some other implementations, the input embedding engine 160 can combine, e.g., by appending, i) the output of the one or more convolutional neural network layers and ii) the respective updated representation for each point assigned to the voxel, generating a respective final representation for each point. The input embedding engine 160 can then determine the voxel embedding for the voxel using the final representations of the points assigned to the voxel, e.g., by processing the final representations using a max-pooling layer.

The voxel embeddings of the voxels represent a three-dimensional embedding of the scene generator input 142 of size W×H×D×C, where W is the number of voxels along a first dimension of the voxel grid (e.g., the width of the voxel grid), H is the number of voxels along a second dimension of the voxel grid (e.g., the height of the voxel grid), D is the number of voxels along a third dimension of the voxel grid (e.g., the depth of the voxel grid), and C is the dimensionality of each voxel embedding.

In some implementations, the input embedding engine 160 "flattens" the three-dimensional embedding of the scene generator input 142 to generate the two-dimensional input embedding 162. The input embedding engine 160 can flatten the three-dimensional embedding of the scene generator input by combining, for each (w,h) coordinate along the first (width) and second (height) dimensions, the respective voxel embeddings for each voxel along the third (depth) dimension. For example, the input embedding 162 can have dimensionality W×H, where each element of the input embedding 162 has dimensionality D×C.

The input embedding 162 is provided as input to the scene refiner neural network 180, which processes the input embedding 162 to generate the final scene point cloud 182.

In some implementations in which the input embedding 162 is a two-dimensional embedding that has dimensionality W×H, the scene refiner neural network 180 can process the two-dimensional embedding 162 using one or more convolutional neural network layers and/or one or more deconvolutional neural network layers to update the embedding 162. Processing the input embedding 162 using convolutional neural network layers can expand the receptive field of the embedding 162, incorporating local contextual information into each element of the embedding 162.

The scene refiner neural network 180 can divide each element of the two-dimensional input embedding 162 into a three-dimensional grid. For example, for each element of the input embedding 162, the three-dimensional grid can have dimensionality K×K×D, where D is the depth of the original three-dimensional embedding of the scene generator input 142 as described above. That is, the scene refiner neural network can recover the three-dimensional information of the flattened input embedding 162, and further refine the resolution of the W and H dimensions so that each original (w,h) coordinate is divided into a K×K grid.

In some implementations, the scene refiner neural network 180 can then apply, for each element of the updated input embedding 162 (having dimensionality K×K×D), one or more convolutional neural network layers and/or one or more deconvolutional neural network layers. Instead or in addition, the scene refiner neural network 180 can apply one or more convolutional neural network layers and/or one or more deconvolutional neural network layers to the entire updated input embedding 162 (having dimensionality W·K×H·K×D).

The scene refiner neural network 180 can then generate the final scene point cloud 182 using the updated input embedding 162. For example, for each element in the updated input embedding 162 (e.g., each element in the W·K×H·K×D grid), the scene refiner neural network 180 can process the representation of the element using one or more neural network layers (e.g., one or more fully-connected neural network layers) to generate an element output that includes i) an anchor probability and ii) an anchor offset. The anchor probability for a particular element represents the likelihood that a point is in the region of the environment represented by the element; for example, the anchor probability can be a floating point value between 0 and 1. The anchor offset represents the offset of the location of the point (if one exists, according to the anchor probability) from the center of the region represented by the element; for example, the anchor offset can be a vector of three floating point values, e.g., (x, y, z) values representing the offset.

The scene refiner neural network 180 can determine the final scene point cloud 182 from the respective anchor probabilities and anchor offsets of the elements of the updated input embedding 162. For example, the scene refiner neural network 180 can determine that there is a point in the final scene point cloud 182 corresponding to each element whose anchor probability satisfies a predetermined threshold, e.g., 0.5, 0.8, or 0.9. For each determined point in the final scene point cloud 182, the scene refiner neural network 180 can determine the location of the point according to the corresponding anchor offset.

Another example process for processing an embedding 162 of a scene generator input 142 using a scene refiner neural network 180 to generate a final scene point cloud 182 is discussed in more detail below with reference to FIG. 9.

In some implementations, the scene generator neural network 130 has been trained in an adversarial fashion. This process is described in more detail below with respect to FIG. 3B and FIG. 10.

Instead or in addition, the scene generator neural network 130 can be trained in a supervised fashion. That is, in some implementations, the scene generator neural network 130 is trained using multi-task learning, i.e., where multiple different parameter updates are determined by respective different training systems (e.g., a supervised training system and an adversarial training system).

As described above, a supervised training system can use the output of a physical modeling process (i.e., a physical modeling process used by the input combination engine 140 to generator the scene generator input 142) as the target output of the scene generator neural network 130. The output of the physical modeling process can be a highly-accurate representation of the scene represented by the initial scene point cloud 124 with the object represented by the object point cloud 122 inserted into the scene. Therefore, using the output of the physical modeling process as the target output in a supervised training system can teach the scene generator neural network 130 to generate point clouds that accurately represent the scene and the inserted objects.

However, the output of the physical modeling process (even though it might match the occlusion pattern of the initial scene point cloud 124) can be unrealistic, i.e., not represent a point cloud that would have been generated by sensors capturing observations of the real world. For example, the output of the physical modeling process might include too many points; i.e., the density of the points in the output is higher than the density of a point cloud generated from real sensor data. Therefore, using a discriminator (as described below) in an adversarial training system to predict whether the final scene point cloud 182 is real or synthetic can teach the scene generator neural network 130 to generate point clouds that appear realistic. Thus, in some implementations, a supervised training process can enforce correctness in the generated final scene point clouds 182 while an adversarial training process can enforce realism in the generated final scene point clouds 182.

In some implementations, the supervised training system determines ground-truth anchor probabilities and ground-truth anchor offsets for each element in a three-dimensional grid of the environment, using the output of the physical modeling process. For example, the supervised training system can divide the output of the physical modeling process into a grid that has the same resolution as the updated input embedding 162 described above (e.g., a W·K×H·K×D grid). Then, for each element in the updated input embedding 162, the supervised training system can determine the ground-truth anchor probability to be '1' if there is at least one point in the corresponding element of the output of the physical modeling process, and '0' otherwise. For each element in the output of the physical modeling process that includes exactly one point, the supervised training system can determine the ground-truth anchor offset to be the offset of the one point from the center of the element. In some implementations, for each element in the output of the physical modeling process that includes multiple points, the supervised training system determines the ground-truth anchor offset to be the average offset of the multiple points from the center of the element. In some other implementations, for each element in the output of the physical modeling process that includes multiple points, the supervised training system randomly samples one of the multiple points and determines the ground-truth anchor offset to be the offset of the randomly-sampled point from the center of the element.

For example, the supervised training system can determine a supervised error $L_{sup}$ of the final scene point cloud 182 by computing:

$$L_{sup} = \frac{1}{|E|} \sum_{e \in E} L_{CE}(e_p, e'_p) + \lambda \frac{1}{|E|} \sum_{e \in E} L_{huber}(e_o, e'_o)$$

where E is the set of all elements in the updated input embedding 162, $e_p$ is the predicted anchor probability for element e, $e_p'$ is the ground-truth anchor probability for element e, $e_o$ is the predicted anchor offset for element e, $e_o'$ is the ground-truth anchor offset for element e, $L_{CE}$ is a cross entropy loss function, $L_{huber}$ is a Huber loss function, and $\lambda$ is a hyperparameter that represents a tradeoff between the focal loss and the Huber loss.

In some implementations, the supervised training system only applies the cross-entropy loss $L_{CE}$ to points in the final scene point cloud 182 that are outside the region corresponding to the inserted object in the environment (i.e., points that correspond to the initial scene point cloud 124 but not to the object point cloud 122). This is because the output of the physical modeling process can have an unrealistic point distribution in the region corresponding to the inserted object, and so the ground-truth anchor probabilities in that region can be inaccurate.

In some implementations, the cross entropy loss function $L_{CE}$ is a focal loss function $L_{focal}$, which adds probability-dependent weight to the cross-entropy loss function. For example, the focal loss function can be $L_{focal} = -(1-e_p)^\gamma \log(e_p)$, where $\gamma$ is a tunable hyperparameter.

The supervised training system can then backpropagate the computed loss through the scene refiner neural network 180 and determine an update to the parameters of the scene refiner neural network 180, e.g., using stochastic gradient descent. In some implementations, the supervised training system can further backpropagate the loss through the input embedding engine 160 and, optionally, the input combination engine 140. That is, each component of the scene generator neural network 130 can be trained concurrently. In some such implementations, the supervised training system can further backpropagate the loss to the object generator neural network 110, thus training the object generator neural network 110 concurrently with the scene generator neural network 130.

Figure 2:
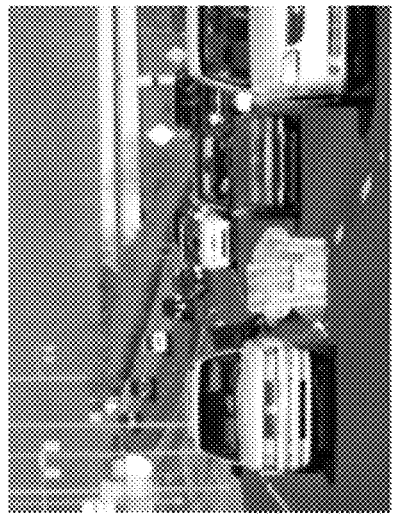
FIG. 2 shows images of example situations that can be characterized by full-scene point clouds generated by a point cloud generation system.
Figure 2:
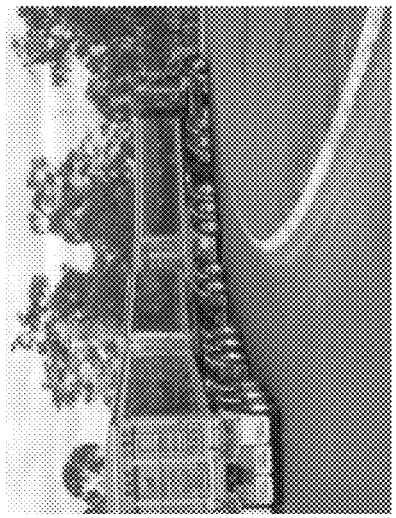
Figure 2:
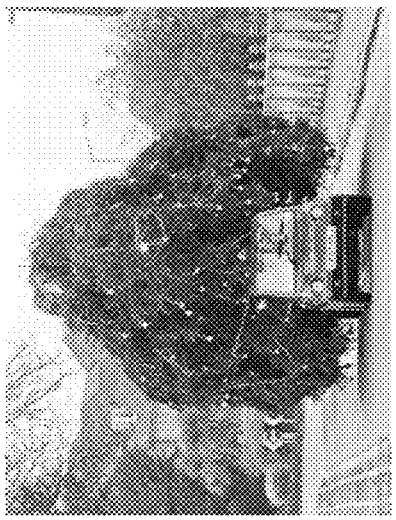

FIG. 2 shows images of example situations that can be characterized by respective full-scene point clouds generated by a point cloud generation system, e.g., the final scene point cloud 182 generated by the point cloud generation system 100 in FIG. 1.

The first image shows an overloaded vehicle 210. Because it is rare in the real world for a vehicle to be carrying such a large load, the training system for an autonomous vehicle may not have a training example of a full-scene point cloud that includes such a vehicle. However, a point cloud generation system can use an object point cloud characterizing a large tree and an initial scene point cloud characterizing an environment to generate a full-scene point cloud that characterizes the environment with the large tree inserted as the load of a vehicle. This full-scene point cloud can be used as a training input by the training system of an autonomous vehicle to expose the autonomous agent to an overloaded vehicle 210. The point cloud generation system can also process the object point cloud characterizing the large tree with an object generator neural network to generate a new object point cloud characterizing another tree, where the new object point cloud has slight perturbations compared to the original object point cloud. The system can then generate multiple realistic but different scene point clouds that characterize environments with various large trees inserted as loads of vehicles.

The second image shows an articulated large vehicle 220. Again, because it is rare in the real world for a vehicle to have three bodies as shown, the training system for an autonomous vehicle may not have access to a full-scene point cloud that includes such a vehicle. A point cloud generation system can use an object point cloud characterizing one of the bodies of the articulated large vehicle 220 to generate a full-scene point cloud that characterizes an environment that contains such a vehicle. Again, this full-scene point cloud can be used as a training input by the training system of an autonomous vehicle to expose the autonomous agent to an articulated large vehicle 220. The point cloud generation system can also process the object point cloud characterizing the body of the articulated large vehicle with an object generator neural network to generate a new object point cloud characterizing another articulated large vehicle. The system can then generate multiple realistic but different scene point clouds that characterize environments that contain various articulated large vehicles.

The third image shows a large object 230 that has fallen off a vehicle. Again, because it is rare in the real-world for a couch to be in the middle of a road, the training system for an autonomous vehicle may not have access to a full-scene point cloud that includes such a fallen-off object 230. A point cloud generation system can use an object point cloud characterizing a couch to generate a full-scene point cloud that characterizes an environment that contains the fallen-off couch 230. Again, this full-scene point cloud can be used as a training input by the training system of an autonomous vehicle. The point cloud generation system can also process the object point cloud characterizing the couch with an object generator neural network to generate a new object point cloud characterizing another couch. The system can then generate multiple realistic but different scene point clouds that characterize environments that contain various fallen-off couches.

Figure 3A:
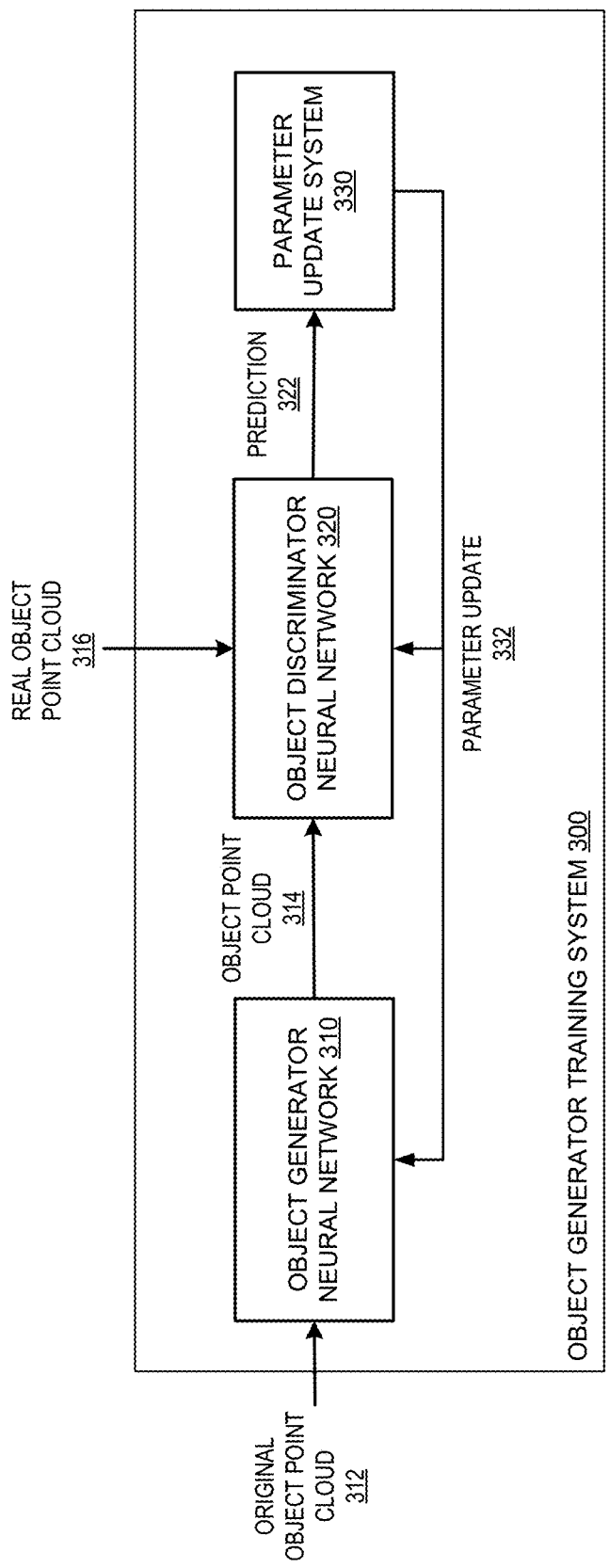
FIG. 3A shows an example object generator training system.

FIG. 3A shows an example object generator training system 300. The object generator training system 300 is an example of a system implemented as computer programs on one or more computers in one or more locations in which the systems, components, and techniques described below are implemented.

The object generator training system 300 is programmed to train an object generator neural network 310 to generate realistic object point clouds using an adversarial object discriminator neural network 320.

The object generator neural network 310 receives input training data in the form of an original object point cloud 312 that characterizes an object. The object generator neural network 310 generates an object point cloud 314 that is different from the original object point cloud 312; e.g., there can be small variations in the positioning of the points in the object point cloud 314 compared to the original object point cloud 312. However, the object point cloud 314 characterizes the same object as the original point cloud 312. In other words, the object point cloud 314 appears to be drawn from the same data distribution as the original object point cloud 312.

The object point cloud 314 is provided as input to the object discriminator neural network 320, which processes the object point cloud 314 to generate an output prediction 322. The prediction 322 predicts whether the object point cloud 314 is real, i.e., representing a real-world object and generated from sensor data captured by one or more sensors, or synthetic, i.e., generated by the object generator neural network 310.

Similarly, the object discriminator neural network 320 can take as input a real object point cloud 316, and generate a prediction 322 predicting whether the real object point cloud 316 is real or synthetic.

The prediction 322 is provided to a parameter update system 330, which uses the prediction 322 to generate a parameter update 332 for the object generator neural network 310 and the object discriminator neural network 320. This process is described in more detail below in reference to FIG. 7.

Figure 3B:
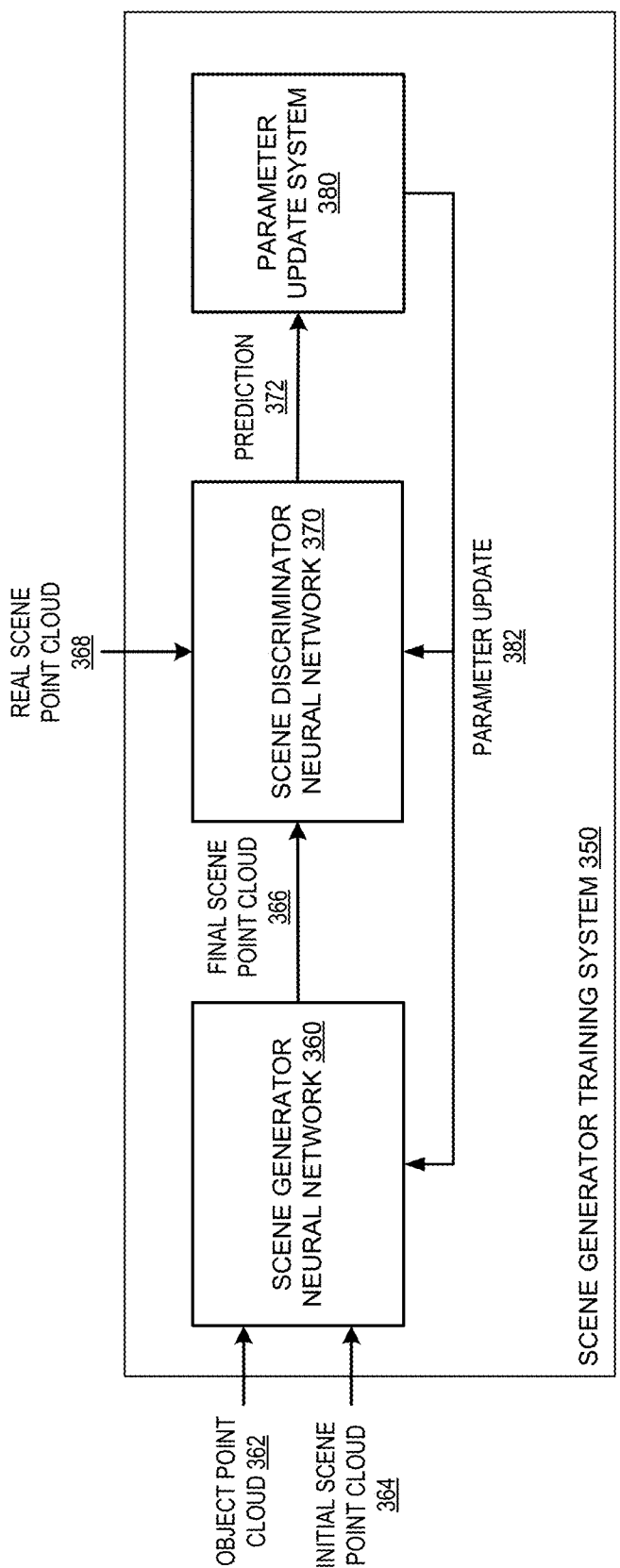
FIG. 3B shows an example scene generator training system.

FIG. 3B shows an example scene generator training system 350. The scene generator training system 350 is an example of a system implemented as computer programs on one or more computers in one or more locations in which the systems, components, and techniques described below are implemented.

The scene generator training system 350 is programmed to train a scene generator neural network 360 to generate realistic final scene point clouds using an adversarial scene discriminator neural network 370.

The scene generator neural network 360 receives input training data in the form of an object point cloud 362 that characterizes an object and an initial scene point cloud 364 that characterizes an environment. The scene generator neural network 360 generates a final scene point cloud 366 that characterizes the environment with the object inserted into the environment.

The final scene point cloud 366 is provided as input to the scene discriminator neural network 370, which processes the final scene point cloud 366 to generate an output prediction 372. The prediction 372 predicts whether the final scene point cloud 366 is real, i.e., representing a real-world environment and generated from sensor data captured by one or more sensors on-board vehicles navigating the real world, or synthetic, i.e., generated by the scene generator neural network 360.

Similarly, the scene discriminator neural network 370 can take as input a real scene point cloud 368, and generate a prediction 372 predicting whether it is real or synthetic.

The prediction 372 is provided to a parameter update system 380, which uses the prediction 372 to generate a parameter update 382 for the scene generator neural network 360 and the scene discriminator neural network 370. This process is described in more detail below in reference to FIG. 10.

Figure 4:
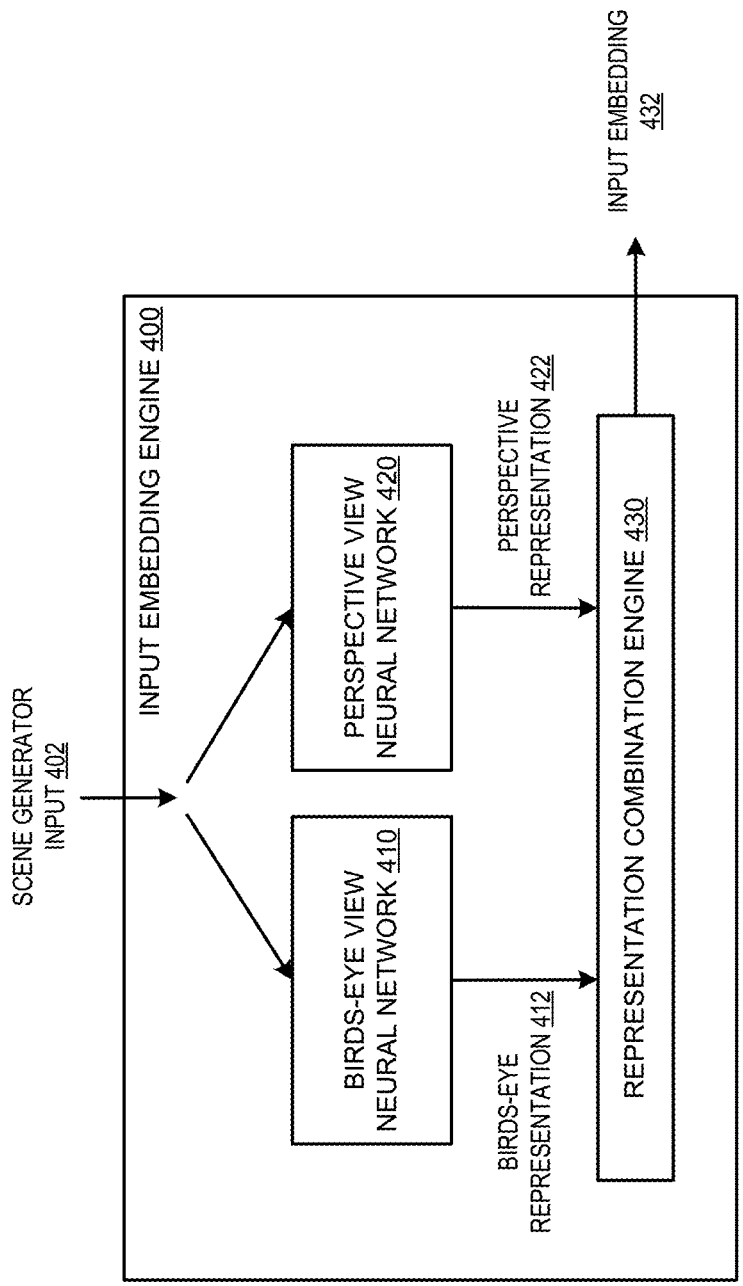
FIG. 4 shows an example input embedding engine.

FIG. 4 shows an example input embedding engine 400. The input embedding engine 400 is an example of a system implemented as computer programs on one or more computers in one or more locations in which the systems, components, and techniques described below are implemented.

The input embedding engine 400 can be a component of a scene generator neural network, e.g., the scene generator neural network 130 depicted in FIG. 1. The input embedding engine 400 is configured to receive a scene generator input 402, e.g., a scene generator input generated by the input combination engine 140 depicted in FIG. 1, and to process the scene generator input 402 to generate an input embedding 432 that is an embedding of the scene generator input 402. The scene generator input 402 represents a point cloud that includes one or more points corresponding to an initial scene point cloud (e.g., the initial scene point cloud 124 depicted in FIG. 1) and an object point cloud (e.g., the object point cloud 122 depicted in FIG. 1).

The scene generator neural network 400 includes one or more view neural networks (in this examples, a birds-eye view neural network 410 and a perspective view neural network 420), and a representation combination engine 430.

The scene generator input 402 is provided as input to each of the view neural networks, e.g., to both the birds-eye view neural network 410 and the perspective view neural network 420. Each of the view neural networks processes the scene generator input 402 according to a different point of view of the environment represented by the initial scene point cloud, in order to generate a respective representation of the scene generator input 402. In particular, the birds-eye view neural network 410 processes the scene generator input 402 with respect to a birds-eye view, i.e., viewing the environment from above, to generate a birds-eye representation 412 of the scene generator input 402. The perspective view neural network 420 processes the scene generator input 402 with respect to a perspective view, i.e., viewing the environment from the point of view of one or more sensors of a vehicle in the environment, to generate a perspective representation 422 of the scene generator input 402. Both the birds-eye representation 412 and the perspective representation 422 can be embeddings of the scene generator input 402 into a high-dimensional feature space, where object semantics and shape information can be captured.

Although two view neural networks are depicted in FIG. 4, in general, an input embedding engine can have one or more view neural networks, each of which processes the scene generator input 402 with respect to any appropriate point of view. This process is described in more detail below with reference to FIG. 8.

The birds-eye representation 412 and the perspective representation 422 are provided to the representation combination engine 430, which combines them to generate the input embedding 432. The input embedding 432 contains information encoded in the high-dimensional feature space embeddings characterized by the birds-eye representation 412 and the perspective representation 422. For example, the representation combination engine 430 can concatenate the respective representations 412 and 422 to generate the input embedding 432.

Figure 5:
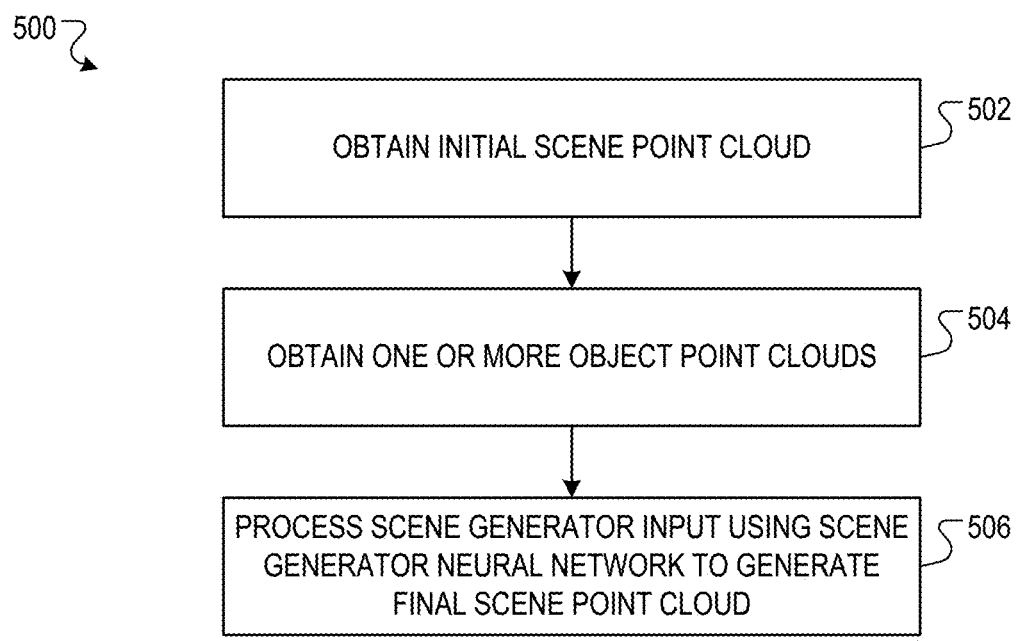
FIG. 5 is a flow diagram of an example process for generating a final scene point cloud.

FIG. 5 is a flow diagram of an example process 500 for generating a final scene point cloud. For convenience, the process 500 will be described as performed by a system of one or more computers located in one or more locations. For example, a scene generator neural network, e.g., the scene generator neural network 130 of FIG. 1, appropriately programmed in accordance with this specification, can perform the process 500.

The system obtains an initial scene point cloud (step 502). The initial scene point cloud characterizes an initial scene in an environment. In some implementations, the initial scene point cloud is generated from sensor readings of the environment captured by one or more sensors.

The system obtains one or more object point clouds (step 504). Each object point cloud characterizes a respective object. Each respective object point cloud can be original, i.e., obtained from real sensor data and provided as an input to the system, or synthetic, i.e., generated by the system or by a separate object generator neural network using a different original object point cloud.

The system processes a scene generator input that includes i) the initial scene point cloud and ii) the one or more object point clouds using a scene generator neural network to generate a final scene point cloud (step 506). The final scene point cloud characterizes a transformed scene that has the one or more objects added to the initial scene. In some implementations, the final scene point cloud characterizes the transformed scene from the point of view of the one or more sensors that captured the initial scene point cloud.

Figure 6:
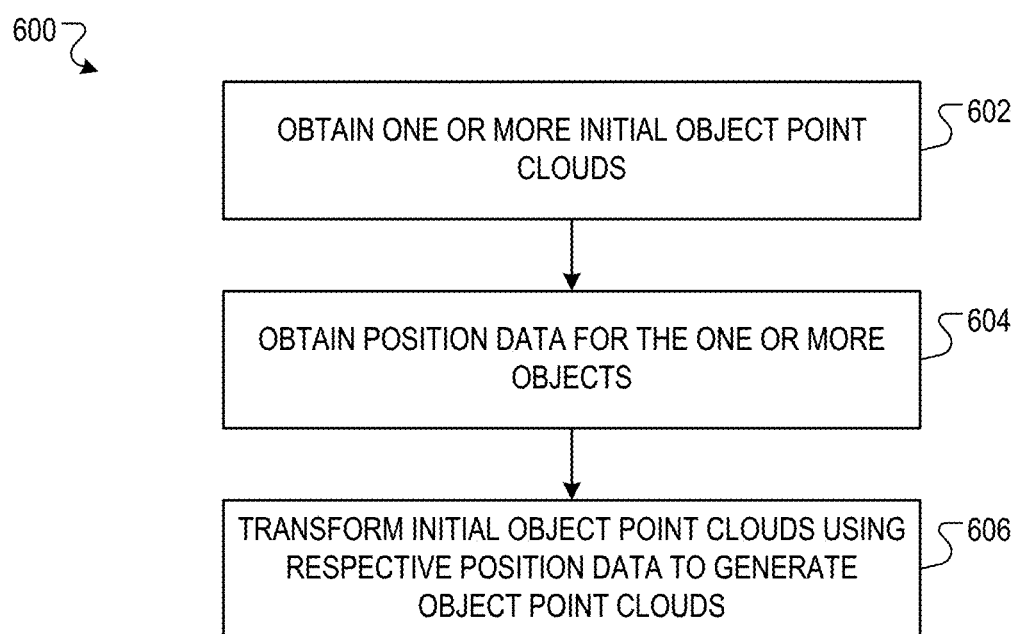
FIG. 6 is a flow diagram of an example process for transforming an initial object point cloud using position data.

FIG. 6 is a flow diagram of an example process 600 for transforming an initial object point cloud using position data. For convenience, the process 600 will be described as performed by a system of one or more computers located in one or more locations. For example, a point cloud transformer, e.g., the point cloud transformer 120 of FIG. 1, appropriately programmed in accordance with this specification, can perform the process 600.

The system obtains one or more initial object point clouds (step 602). The initial object point clouds can be real, i.e., obtained from real sensor data, or synthetic, e.g., generated by an object generator neural network.

The system obtains position data for the one or more objects (step 604). The position data for a respective object identifies a desired realistic location of the object in an environment and a desired realistic pose of the object. The pose of an object characterizes an orientation of the object with respect to a certain point of view. In this specification, "realistic" means the object could plausibly be found in the given location and pose in the real world, e.g., there might exist a real scene point cloud that characterizes the object in the given location and pose.

The system transforms the one or more initial point clouds using the respective position data to generate object point clouds (step 606). The object point clouds include the location and pose information encoded in the position data. For example, in some implementations the system translates and rotates the initial object point clouds according to parameters in the respective position data.

In some implementations, each of the points of the initial object point cloud is represented as coordinates in a coordinate system whose origin is the center of the object. The translation and rotation can be accomplished by performing a linear transformation on the coordinates of each of the points of the initial object point cloud, moving them to a coordinate system where the origin is the center of the environment and where the object is in the desired pose and location in the environment.

Figure 7:
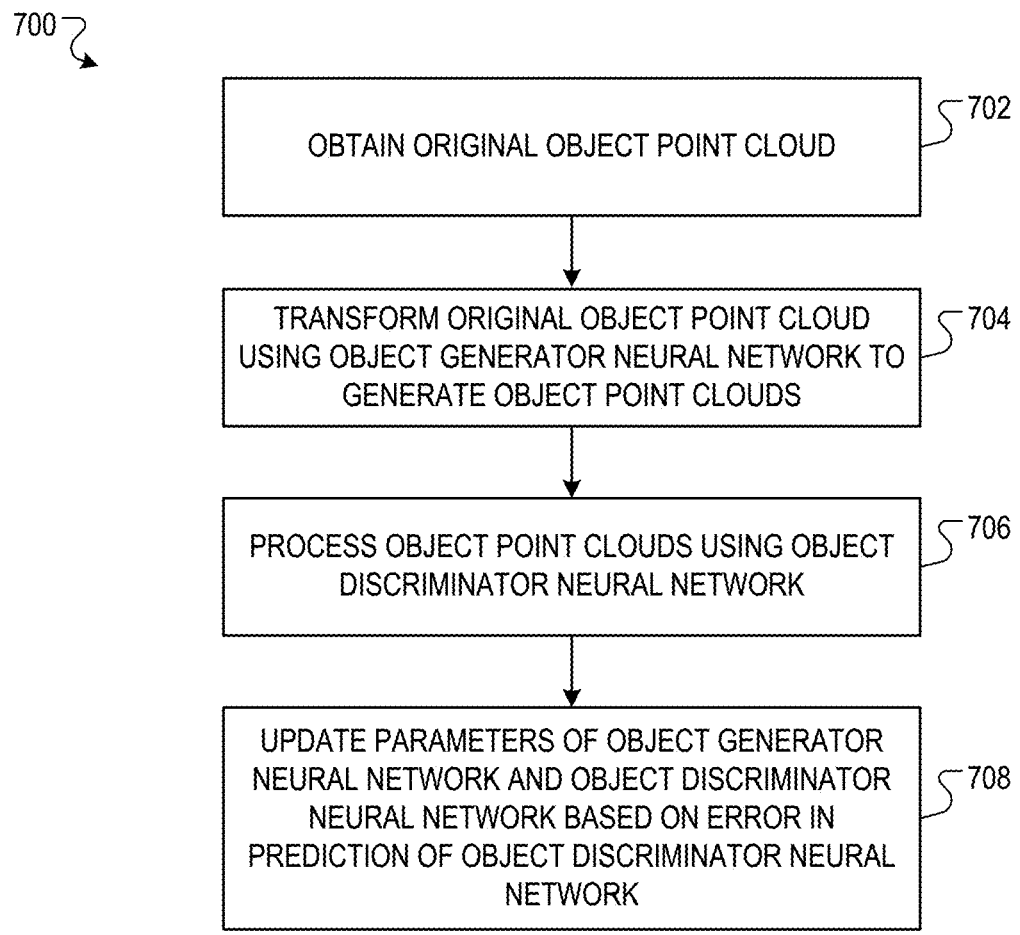
FIG. 7 is a flow diagram of an example process for training an object generator neural network using an adversarial object discriminator neural network.

FIG. 7 is a flow diagram of an example process 700 for training an object generator neural network using an adversarial object discriminator neural network. For convenience, the process 700 will be described as performed by a system of one or more computers located in one or more locations. For example, an object generator training system, e.g., the object generator training system 300 of FIG. 3A, appropriately programmed in accordance with this specification, can perform the process 700.

The system obtains an original object point cloud (step 702).

The system transforms the original object point cloud using the object generator neural network to generate one or more object point clouds (step 704). As described above, the object point clouds are different from the original object point cloud but appear to be drawn from the same data distribution as the original object point clouds.

The system processes the object point clouds using the object discriminator neural network (step 706). The object discriminator neural network predicts whether a given object point cloud is a real object point cloud or a synthetic object point cloud.

In some implementations, the discriminator neural network processes the object point clouds using one or more convolutional neural network layers and/or one or more deconvolutional neural network layers. For example, for each object point cloud, the discriminator neural network can process each point in the object point cloud using one or more fully-connected neural network layers and one or more convolutional neural network layers to generate the respective prediction.

The system updates the parameters of the object generator neural network and the object discriminator neural network based on an error in the prediction of object discriminator neural network (step 708). For example, if the object discriminator neural network correctly predicted that an object point cloud is synthetic, the parameter update system can update the parameters of the object generator neural network to improve the generated object point clouds. Conversely, if the object discriminator neural network incorrectly predicted that an object point cloud is synthetic, the parameter update system can update the parameters of the object discriminator neural network to improve the predictions of the object discriminator neural network. The system can backpropagate the error in the prediction through both networks, thus training both networks simultaneously in an adversarial manner.

For example, the loss function for the object generator neural network and object discriminator neural network can be the Wasserstein loss function, which is:

$$D(x)-D(G(z)),$$

where $D(x)$ is the probability assigned by the object discriminator neural network that a real object point cloud is real, $G(z)$ is a synthetic object point cloud generated by the object generator neural network, and $D(G(z))$ is the probability assigned by the object discriminator neural network that the synthetic object point cloud is real. The goal of the object generator neural network is to minimize Wasserstein loss by maximizing $D(G(z))$. That is, the goal of the object generator neural network is to cause the object discriminator neural network to predict that a synthetic object point cloud is real. The goal of the object discriminator neural network is to maximize Wasserstein loss, i.e., to correctly predict both real and synthetic object point clouds.

As another example, the loss function for the object generator neural network and object discriminator neural network can be the following loss function:

$$\log(D(x)) + \log(1 - D(G(z)))$$

where again the objective of the object generator neural network is to minimize the loss and the objective of the object discriminator neural network system is to maximize the loss.

Figure 8:
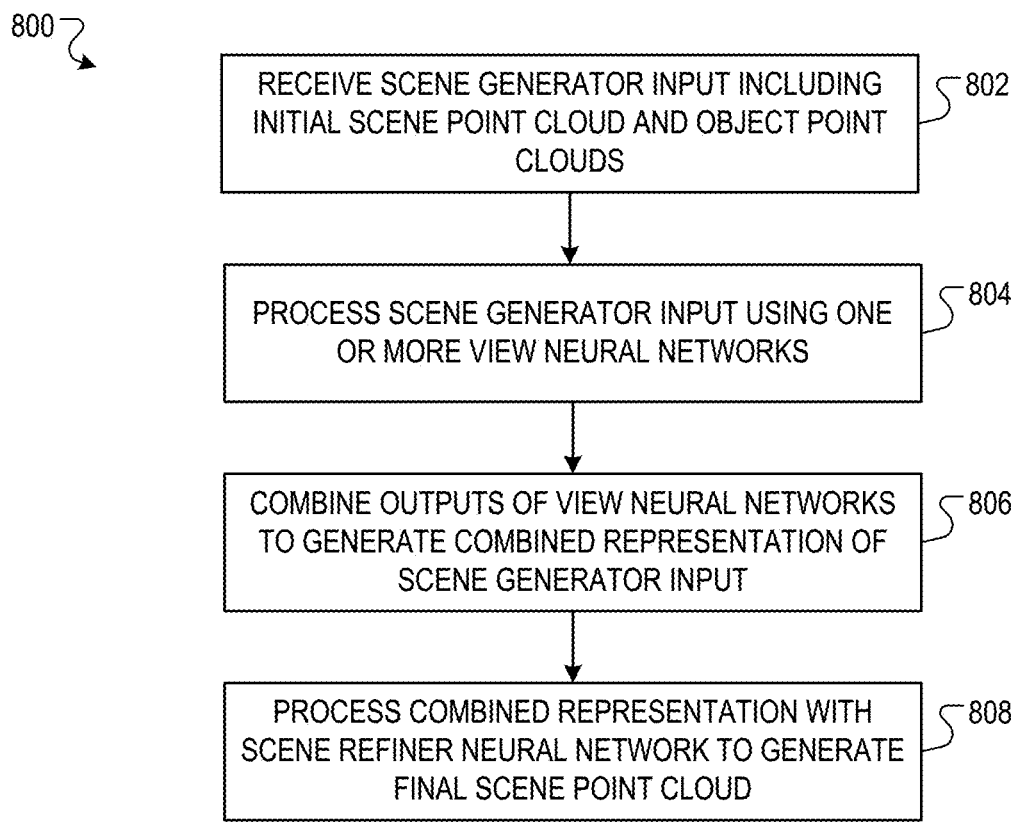
FIG. 8 is a flow diagram of an example process for generating a final scene point cloud from an initial scene point cloud and one or more object point clouds.

FIG. 8 is a flow diagram of an example process 800 for generating a final scene point cloud from an initial scene point cloud and one or more object point clouds. For convenience, the process 800 will be described as performed by a system of one or more computers located in one or more locations. For example, a scene generator neural network, e.g., the scene generator neural network 130 of FIG. 1, appropriately programmed in accordance with this specification, can perform the process 800.

The system receives a scene generator input that includes i) the initial scene point cloud and ii) the one or more object point clouds (step 802).

The system processes the scene generator input using one or more view neural networks (step 804). The view neural networks can include a birds-eye view neural network and a perspective view neural network. A view neural network processes the points in a point cloud with respect to the given point of view.

The input to a view neural network can be an N×3 matrix, where each row of the matrix contains the coordinates of a given point in a three-dimensional coordinate system. The matrix can contain the points from both the initial scene point cloud and the one or more object point clouds.

A view neural network can first divide the environment characterized by the initial scene point cloud into multiple voxels, where each voxel represents a volume of space in the environment. The view neural network divides the environment into voxels according to the respective point of view of the network. For example, a perspective view neural network can divide the environment into voxels that extend radially from a vehicle in the environment, while a birds-eye view neural network can divide the environment into a grid of cubic or rectangular voxels as viewed from above the environment.

After dividing the environment into voxels, the view neural network can assign each point to the voxel that the point is in. The view neural network can then process the scene generator input using an embedding neural network, i.e., process each point using the embedding neural network to extract view-dependent features from each point and generate a view-dependent embedding of each point. For example, the embedding neural network can include one or more fully-connected neural network layers.

The view neural network can then aggregate, for each voxel, the respective point embedding of each point in the voxel to generate a voxel embedding for the voxel. For example, the view neural network can apply a max-pooling layer to the point embeddings of the points in the voxel.

The view neural network can then process the respective initial voxel embeddings for each voxel in the voxel grid to update the voxel embeddings. For example, the view neural network can apply one or more one-dimensional convolutional neural network layers to each voxel embedding in the voxel grid, to extract view-dependent contextual information, generating an updated voxel embedding for each voxel.

Then, for each voxel, the view neural network can assign the respective updated voxel embedding to each point in the voxel, generating an N×k matrix, where each row corresponds to a point from the original input matrix and contains the k-dimensional updated voxel embedding representing the voxel to which the respective point was assigned.

In some implementations, the system first processes each point in the initial scene point cloud and the one or more object point clouds with a fully-connected layer that is shared by all of the one or more view neural networks, in order to embed the points into a high-dimensional feature space. This embedding is then processed by each of the view neural networks separately, e.g., using the architecture described above.

The system combines the outputs of the view neural networks to generate a embedding of the scene generator input (step 806). In some implementations, the system horizontally concatenates the matrix outputs of the view neural networks to generate the embedding, generating a matrix for which each row corresponds to a point in one of the input point clouds, and the row corresponding to a given point is a concatenation of the different updated voxel embeddings (corresponding to respective view neural networks) of the given point. In some implementations, the system also concatenates the output of the shared fully-connected layer to the embedding of the scene generator input.

The system processes the embedding of the scene generator input using a scene refiner neural network to generate the final scene point cloud (step 808). The scene refiner neural network is configured to generate a final scene point cloud so that it appears as if the final scene point cloud were measured by one or more sensors on a vehicle. This process is described in more detail below in reference to FIG. 9.

Figure 9:
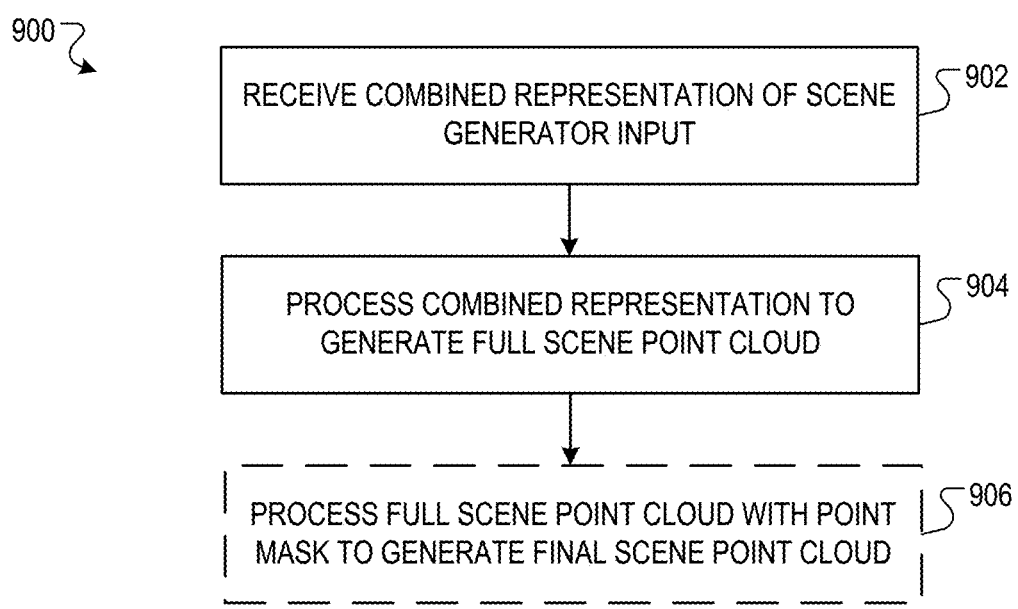
FIG. 9 is a flow diagram of an example process for generating a final scene point cloud from an embedding of a scene generator input.

FIG. 9 is a flow diagram of an example process 900 for generating a final scene point cloud from an embedding of a scene generator input. For convenience, the process 900 will be described as performed by a system of one or more computers located in one or more locations. For example, a scene refiner neural network, e.g., the scene refiner neural network 180 of FIG. 1, appropriately programmed in accordance with this specification, can perform the process 900.

The system receives the embedding of the scene generator input (step 902). The embedding can be obtained from an input embedding engine, e.g., the input embedding engine 160 depicted in FIG. 1.

The system processes the embedding of the scene generator input to generate a full scene point cloud (step 904). For example, the system can process the embedding using one or more convolutional and deconvolutional neural network layers.

In some cases, the full scene point cloud generated in step 904 might be unrealistic because it contains too many points. That is, the density of points in the full scene point cloud is unrealistically high. As described above, when a real point cloud is generated by sensors on-board a vehicle, the real point cloud is often imperfect and does not have full coverage of the objects in the environment. A perfectly-formed point cloud with full coverage of all objects would therefore clearly be synthetic, and easily predicted as synthetic by a scene discriminator neural network during training.

Optionally, the system processes the full scene point cloud to generate the final scene point cloud (step 906).

In some implementations, the system processes the full scene point cloud using a point mask. The point mask filters out a subset of the points in the full scene point cloud to adapt the full scene point cloud to appear as if it were measured by sensors on a vehicle. By losing full coverage of all objects in the environment, the final scene point cloud appears more real, and is more likely to be predicted to be real by a scene discriminator neural network. The point mask can be a vector of 1s and 0s that is combined with the full scene point cloud such that the points in the full scene point cloud that are matched to a 0 are filtered out.

In some implementations, this point mask is machine learned. For example, the system can process each point in the full scene point cloud using a point mask neural network that assigns the point a value, e.g., a probability between 0 and 1. The system can then filter out every point whose value does not surpass a certain threshold, e.g. 0.5. The point mask neural network can be machine trained; for example, the point mask neural network can be adversarially trained in conjunction with a scene discriminator neural network, e.g., the scene discriminator neural network 370 in FIG. 3B.

Figure 10:
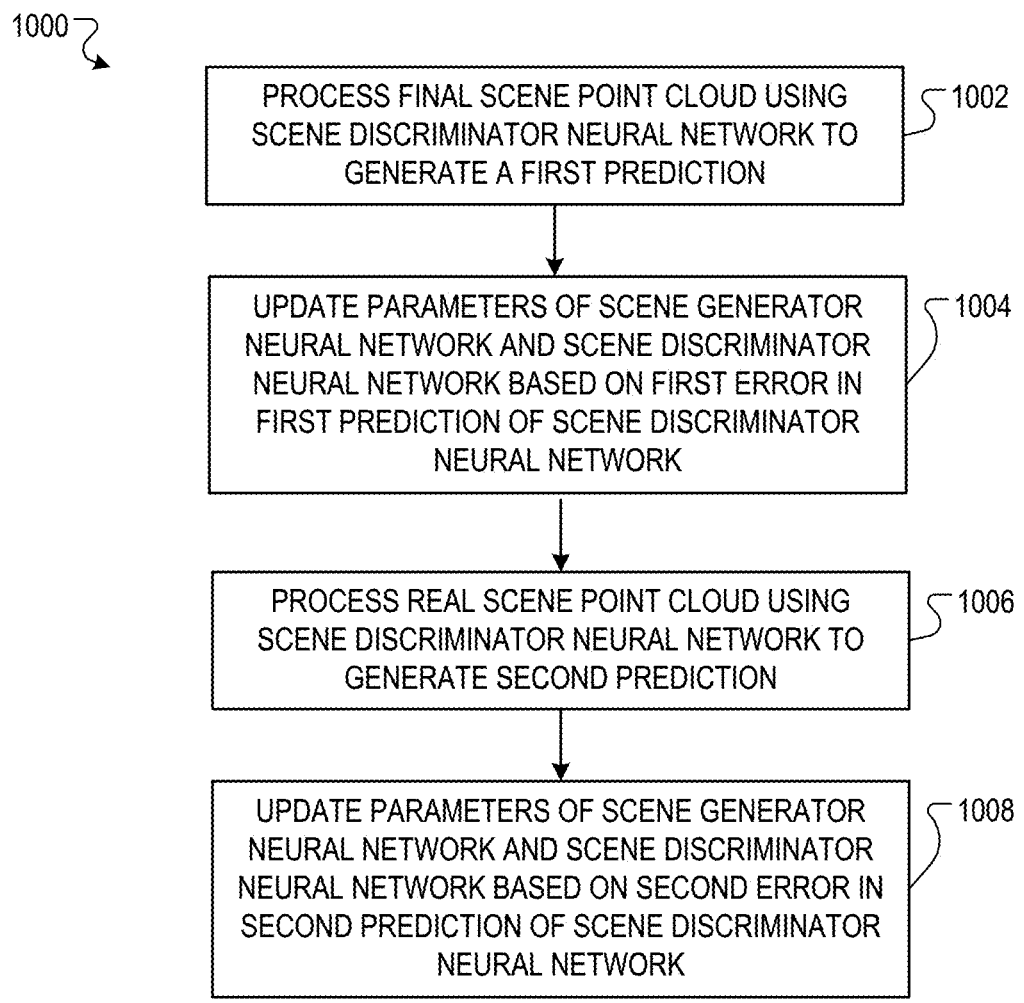
FIG. 10 is a flow diagram of an example process for training a scene generator neural network using an adversarial scene discriminator neural network.

FIG. 10 is a flow diagram of an example process 1000 for training a scene generator neural network using an adversarial scene discriminator neural network. For convenience, the process 1000 will be described as performed by a system of one or more computers located in one or more locations. For example, a scene generator training system, e.g., the scene generator training system 350 of FIG. 3B, appropriately programmed in accordance with this specification, can perform the process 1000.

The system processes a final scene point cloud using the scene discriminator neural network to generate a first prediction (step 1002). The final scene point cloud is generated by the scene generator neural network. The prediction predicts whether the final scene point cloud is real or synthetic.

In some implementations, the scene discriminator neural network processes the final scene point cloud using one or more convolutional neural network layers and/or one or more deconvolutional neural network layers. For example, the scene discriminator neural network can process each point in the final scene point cloud using one or more fully-connected neural network layers and one or more convolutional neural network layers.

As another example, the scene discriminator neural network can divide the final scene point cloud into a voxel grid as described above. Then, for each voxel in the voxel grid, the scene discriminator neural network can generate a voxel representation for the voxel. As a particular example, for each voxel in the voxel grid, the scene discriminator neural network can process each point in the voxel using one or more fully-connected and/or one or more convolutional neural network layers to generate the voxel representation for the voxel.

As another particular example, in implementations in which the scene generator neural network generated anchor probabilities for each element of a three-dimensional grid, the scene discriminator neural network can combine, for each voxel, the respective anchor probabilities of the elements in the voxel to generate the voxel representation for the voxel. For example, the scene discriminator neural network can combine the respective anchor probabilities using a sum-pooling layer. For a real final scene point cloud, the anchor probabilities can be determined to be 1 for each element that includes a point.

The scene discriminator neural network can then process the respective voxel representations of each voxel in the voxel grid to generate the prediction, e.g., using one or more convolutional neural network layers.

The system updates the parameters of the scene generator neural network and the scene discriminator neural network based on a first error in the first prediction of the scene discriminator neural network (step 1004). For example, if the scene discriminator neural network correctly predicted that the final scene point cloud is synthetic, the parameter update system can update the parameters of the scene generator neural network to improve the generated final scene point clouds.

The system processes a real scene point cloud using the scene discriminator neural network to generate a second prediction (step 1006). The real scene point cloud is obtained from one or more sensors on-board a vehicle. The second prediction predicts whether the real scene point cloud is real or synthetic.

The system updates the parameters of the scene generator neural network and the scene discriminator neural network based on a second error in the second prediction of the scene discriminator neural network (step 1008). For example, if the scene discriminator neural network incorrectly predicted that the real scene point cloud is synthetic, the parameter update system can update the parameters of the scene discriminator neural network to improve predictions generated by the scene discriminator neural network.

For example, similar to the object generator neural network and object discriminator neural network, the loss function for the scene generator neural network and scene discriminator neural network can be the Wasserstein loss function, which is:

$$D(x)-D(G(z)),$$

where $D(x)$ is the probability assigned by the scene discriminator neural network that a real scene point cloud is real, $G(z)$ is a synthetic scene point cloud generated by the scene generator neural network, and $D(G(z))$ is the probability assigned by the scene discriminator neural network that the synthetic scene point cloud is real. The goal of the scene generator neural network is to minimize Wasserstein loss by maximizing $D(G(z))$, i.e., to cause the scene discriminator neural network to predict that a synthetic scene point cloud is real. The goal of the scene discriminator neural network is to maximize Wasserstein loss, i.e., to correctly predict both real and synthetic scene point clouds.

As another example, the loss function for the scene generator neural network and scene discriminator neural network can be the following loss function:

$$\log(D(x))+\log(1-D(G(z)))$$

where again the objective of the scene generator neural network is to minimize the loss and the objective of the scene discriminator neural network system is to maximize the loss.

A point cloud generation system, e.g., the point cloud generation system 100 in FIG. 1, can be used to generate multiple scene point clouds that characterize the same environment across multiple time points. For example, an initial scene point cloud can characterize an empty intersection, and an object point cloud can characterize a vehicle. The point cloud generation system can generate multiple scene point clouds that characterize the vehicle moving through the intersection over time. These scene point clouds can be used to train neural networks used in the operation of autonomous vehicles, e.g. a training system can simulate a scenario over time by providing the scene point clouds to the neural networks sequentially.

Figure 11:
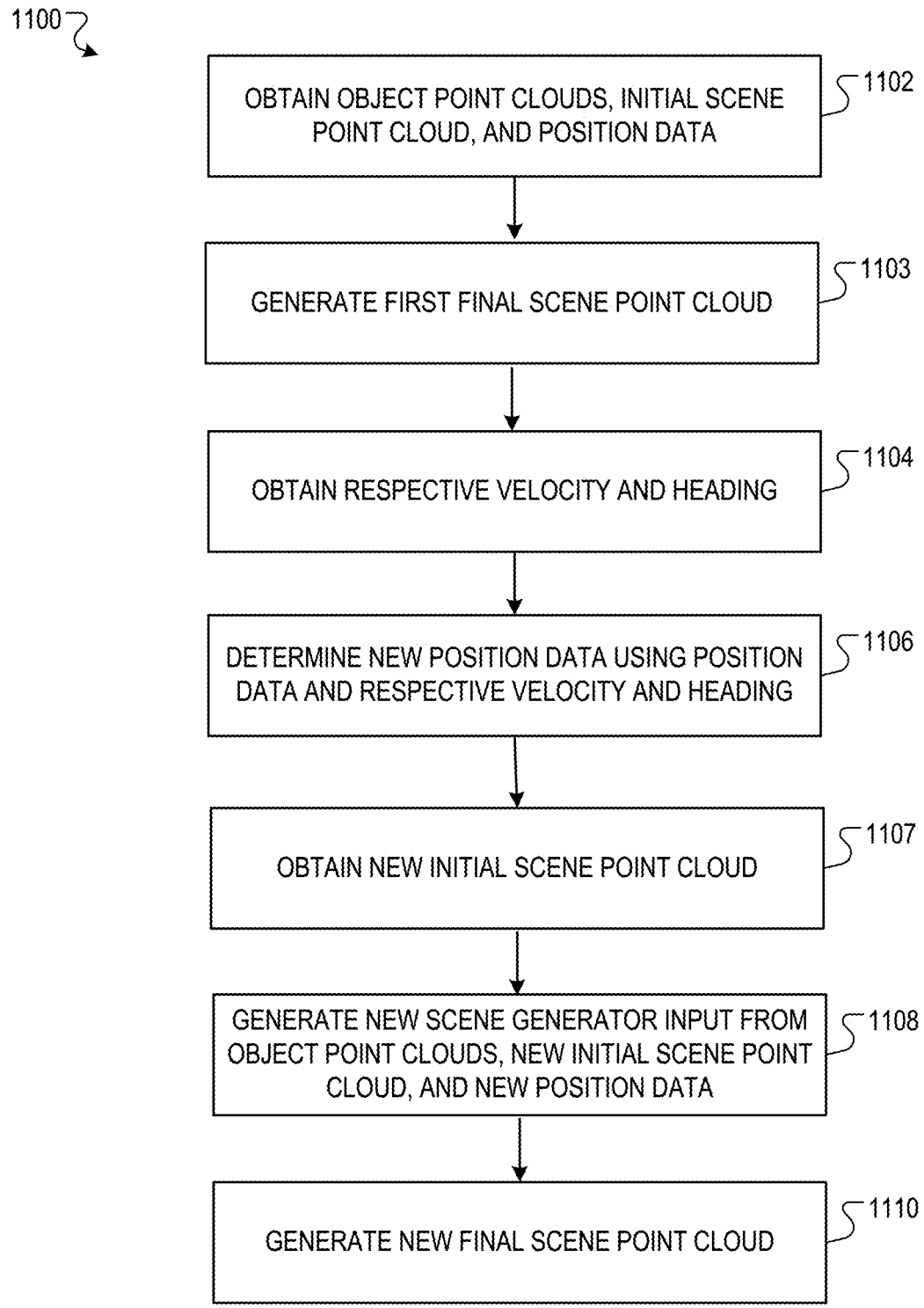
FIG. 11 is a flow diagram of an example process for generating a new final scene point cloud that characterizes the scene at a later time point than a first final scene point cloud.

FIG. 11 is a flow diagram of an example process 1100 for generating a new final scene point cloud that characterizes the scene at a later time point than a first final scene point cloud. For convenience, the process 1100 will be described as performed by a system of one or more computers located in one or more locations. For example, a point cloud generation system, e.g., the point cloud generation system 100 of FIG. 1, appropriately programmed in accordance with this specification, can perform the process 1100.

The system obtains an initial scene point cloud, one or more object point clouds, and respective position data for the one or more objects (step 1102). The initial scene point cloud characterizes a scene at a first time point. The position data characterizes the location and heading of the respective objects at the first time point.

The system generates a first final scene point cloud (step 1103). The system can generate the first final scene point cloud by processing a scene generator input that includes the initial scene point cloud, the one or more object point clouds, and the position data using a scene generator neural network, e.g., the scene generator neural network 130 of FIG. 1. The first final scene point cloud characterizes the scene at the first time point.

The system obtains a respective velocity and a respective heading for each of the one or more objects (step 1104). The velocity and heading of an object characterizes motion of the object through the scene over time. In some implementations, the system can also obtain one or more other motion parameters for each of the one or more objects, e.g., a respective acceleration, jerk, etc.

The system determines new position data for each respective object using the position data and the respective velocity and heading (step 1106). The new position data characterizes the location and heading of each respective object at a second time point that is later than the first time point. The new position data can be inferred from the position data by advancing time using the respective velocities and headings.

The system obtains a new initial scene point cloud (step 1107). The new initial scene point cloud characterizes the same scene as the first initial scene point cloud at the second time point.

The system generates a new scene generator input from the one or more object point clouds, the new initial scene point cloud, and the new position data (step 1108). The new scene generator input can be generated using a point cloud transformer, e.g., the point cloud transformer 120 of FIG. 1, to combine the new position data and the object point clouds to place the object point clouds in the same coordinate system as the initial scene point cloud in the correct respective location and pose.

The system generates a new final scene point cloud using the new scene generator input (step 1110). The system can generate the new final scene point cloud by processing the new scene generator input using a scene generator neural network, e.g. the scene generator neural network 130 of FIG. 1. The new final scene point cloud characterizes the scene at the second time point.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
obtaining an initial scene point cloud characterizing an initial scene in an environment;
obtaining, for each of one or more objects, an object point cloud that characterizes the object; and
processing a first input comprising the initial scene point cloud and the one or more object point clouds using a first neural network that is configured to process the first input to generate a final scene point cloud that characterizes a transformed scene that has the one or more objects added to the initial scene.

Embodiment 2 is the method of embodiment 1, wherein the initial scene point cloud is generated from sensor readings of the environment captured by one or more first sensors.

Embodiment 3 is the method of embodiment 2, wherein the final scene point cloud characterizes the transformed scene from the point of view of the one or more first sensors.

Embodiment 4 is the method of any one of embodiments 1-3, wherein obtaining, for each of one or more objects, an object point cloud that characterizes the object comprises:
obtaining initial object point clouds for the one or more objects;
obtaining position data for the one or more objects, the position data of an object identifying a desired realistic location of the object in the scene and a desired realistic pose of the object, the pose being an orientation of the object with respect to a certain point of view; and
transforming the one or more initial point clouds using the respective position data to generate the object point clouds.

Embodiment 5 is the method of embodiment 4, wherein transforming the one or more initial object point clouds using the respective position data comprises translating and rotating the initial object point clouds according to parameters in the respective position data.

Embodiment 6 is the method of embodiment 5, further comprising generating a new final scene point cloud that characterizes the transformed scene that has the one or more objects at a later time than the final scene point cloud, comprising:

obtaining a respective velocity and heading of the one or more objects;

determining new position data for the one or more objects from the position data and the respective velocity and headings of the one or more objects;

obtaining a new initial scene point cloud;

generating a second input from the new initial scene point cloud, the one or more object point clouds, and the new position data; and processing the second input using the first neural network to generate the new final scene point cloud.

Embodiment 7 is the method of any one of embodiments 1-6, wherein obtaining, for each of one or more objects, an object point cloud that characterizes the object comprises:

obtaining, for each of the one or more objects, original object point clouds; and transforming the one or more original object point clouds using a second neural network to generate the object point clouds so that the object point clouds are different from the original object point clouds but appear to be drawn from the same data distribution as the original object point clouds.

Embodiment 8 is the method of embodiment 7, further comprising:

processing the one or more object point clouds using a third neural network that predicts whether a given object point cloud is a real object point cloud or a synthetic object point cloud.

Embodiment 9 is the method of embodiment 8, further comprising:

updating the parameters of the second neural network based on an error in the prediction of the third neural network; and updating the parameters of the third neural network based on the error in the prediction of the third neural network.

Embodiment 10 is the method of any one of embodiments 1-9, further comprising:

generating the first input by concatenating the initial scene point cloud and the one or more object point clouds.

Embodiment 11 is the method of any one of embodiments 1-10, wherein processing the first input using a first neural network comprises:

processing the first input using one or more view neural networks, wherein a view neural network extracts features from the first input with respect to a certain point of view; and combining the outputs of the one or more view neural networks to generate an embedding of the first input.

Embodiment 12 is the method of embodiment 11, wherein the one or more view neural network includes a birds-eye view neural network that extracts features with respect to a birds-eye view and a perspective view neural network that extracts features with respect to a perspective view.

Embodiment 13 is the method of any one of embodiments 11 or 12, further comprising:

processing the embedding of the first input with a fourth neural network to generate the final scene point cloud, wherein the fourth neural network is configured to generate a final scene point cloud that appears as if it were measured by one or more sensors on a vehicle.

Embodiment 14 is the method of embodiment 13, wherein processing the embedding of the first input with a fourth neural network to generate the final scene point cloud comprises:

processing the embedding of the first input to generate a dense scene point cloud; and generating the final scene point cloud by processing the dense scene point cloud with a point mask that filters out one or more points to adapt the dense scene point cloud to appear as if it were measured by one or more sensors on a vehicle.

Embodiment 15 is the method of embodiment 14, wherein the point mask is machine-learned.

Embodiment 16 is the method of any one of embodiments 1-15, further comprising:

processing the final scene point cloud using a fifth neural network that predicts whether the final scene point cloud is a real scene point cloud or a synthetic scene point cloud.

Embodiment 17 is the method of embodiment 16, further comprising:

updating the parameters of the fifth neural network based on a first error in the prediction of the fifth neural network; and updating the parameters of the first neural network based on the first error in the prediction of the fifth neural network.

Embodiment 18 is the method of embodiment 17, further comprising:

processing a real scene point cloud, generated from sensor readings of a third environment captured by one or more third sensors, using the fifth neural network;

updating the parameters of the fifth neural network based on a second error in the prediction of the fifth neural network; and updating the parameters of the first neural network based on the second error in the prediction of the fifth neural network.

Embodiment 19 is a system comprising: one or more computers and one or more storage devices storing instructions that are operable, when executed by the one or more computers, to cause the one or more computers to perform the method of any one of embodiments 1 to 18.

Embodiment 20 is one or more non-transitory computer storage media encoded with a computer program, the program comprising instructions that are operable, when executed by data processing apparatus, to cause the data processing apparatus to perform the method of any one of embodiments 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining an initial scene point cloud characterizing an initial scene in an environment;
obtaining, for each of one or more objects, an object point cloud that characterizes the object; and
processing a first input comprising the initial scene point cloud and the one or more object point clouds using a first neural network that is configured to process the first input to generate a final scene point cloud that characterizes a transformed scene that has the one or more objects added to the initial scene.

2. The method of claim 1, wherein the initial scene point cloud is generated from sensor readings of the environment captured by one or more first sensors.

3. The method of claim 2, wherein the final scene point cloud characterizes the transformed scene from a point of view of the one or more first sensors.

4. The method of claim 1, wherein obtaining, for each of one or more objects, an object point cloud that characterizes the object comprises:
obtaining initial object point clouds for the one or more objects;
obtaining position data for the one or more objects, the position data of an object identifying a desired realistic location of the object in the initial scene and a desired realistic pose of the object, the pose being an orientation of the object with respect to a certain point of view; and
transforming the one or more initial object point clouds using the respective position data to generate the object point clouds.

5. The method of claim 4, wherein transforming the one or more initial object point clouds using the respective position data comprises translating and rotating the initial object point clouds according to parameters in the respective position data.

6. The method of claim 5, further comprising generating a new final scene point cloud that characterizes the transformed scene that has the one or more objects at a later time than the final scene point cloud, comprising:
obtaining a respective velocity and heading of the one or more objects;
determining new position data for the one or more objects from the position data and the respective velocity and headings of the one or more objects;
obtaining a new initial scene point cloud;
generating a second input from the new initial scene point cloud, the one or more object point clouds, and the new position data; and
processing the second input using the first neural network to generate the new final scene point cloud.

7. The method of claim 1, wherein obtaining, for each of one or more objects, an object point cloud that characterizes the object comprises:
obtaining, for each of the one or more objects, original object point clouds; and
transforming the one or more original object point clouds using a second neural network to generate the object point clouds so that the object point clouds are different from the original object point clouds but appear to be drawn from a same data distribution as the original object point clouds.

8. The method of claim 7, further comprising:
processing the one or more object point clouds using a third neural network that predicts whether a given object point cloud is a real object point cloud or a synthetic object point cloud.

9. The method of claim 8, further comprising:
updating a set of parameters of the second neural network based on an error of the third neural network; and
updating a set of parameters of the third neural network based on the error of the third neural network.

10. The method of claim 1, further comprising:
generating the first input by concatenating the initial scene point cloud and the one or more object point clouds.

11. The method of claim 1, wherein processing the first input using a first neural network comprises:
processing the first input using one or more view neural networks, wherein a view neural network extracts features from the first input with respect to a certain point of view; and
combining outputs of the one or more view neural networks to generate an embedding of the first input.

12. The method of claim 11, wherein the one or more view neural networks include a birds-eye view neural network that extracts features with respect to a birds-eye view and a perspective view neural network that extracts features with respect to a perspective view.

13. The method of claim 11, further comprising:
processing the embedding of the first input with a fourth neural network to generate the final scene point cloud, wherein the fourth neural network is configured to generate a final scene point cloud that appears as if it were measured by one or more sensors on a vehicle.

14. The method of claim 13, wherein processing the embedding of the first input with a fourth neural network to generate the final scene point cloud comprises:
processing the embedding of the first input to generate a dense scene point cloud; and
generating the final scene point cloud by processing the dense scene point cloud with a point mask that filters out one or more points to adapt the dense scene point cloud to appear as if it were measured by one or more sensors on a vehicle.

15. The method of claim 14, wherein the point mask is machine-learned.

16. The method of claim 1, further comprising:
processing the final scene point cloud using a fifth neural network that predicts whether the final scene point cloud is a real scene point cloud or a synthetic scene point cloud.

17. The method of claim 16, further comprising:
updating a set of parameters of the fifth neural network based on a first error of the fifth neural network; and
updating a set of parameters of the first neural network based on the first error of the fifth neural network.

18. The method of claim 17, further comprising:
processing a real scene point cloud, generated from sensor readings of a third environment captured by one or more third sensors, using the fifth neural network;
updating the set of parameters of the fifth neural network based on a second error of the fifth neural network; and
updating the set of parameters of the first neural network based on the second error of the fifth neural network.

19. A system comprising one or more computers and one or more storage devices storing instructions that are operable, when executed by the one or more computers, to cause the one or more computers to perform operations comprising:
obtaining an initial scene point cloud characterizing an initial scene in an environment;
obtaining, for each of one or more objects, an object point cloud that characterizes the object; and
processing a first input comprising the initial scene point cloud and the one or more object point clouds using a first neural network that is configured to process the first input to generate a final scene point cloud that characterizes a transformed scene that has the one or more objects added to the initial scene.

20. The system of claim 19, wherein the initial scene point cloud is generated from sensor readings of the environment captured by one or more first sensors.

21. The system of claim 20, wherein the final scene point cloud characterizes the transformed scene from a point of view of the one or more first sensors.

22. The system of claim 19, wherein obtaining, for each of one or more objects, an object point cloud that characterizes the object comprises:
obtaining initial object point clouds for the one or more objects;
obtaining position data fro the one or more objects, the position data of an object identifying a desired realistic location of the object in the initial scene and a desired realistic pose of the object, the pose being an orientation of the object with respect to a certain point of view; and
transforming the one or more initial object point clouds using the respective position data to generate the object point clouds.

23. The system of claim 22, wherein transforming the one or more initial object point clouds using the respective position data comprises translating and rotating the initial object point clouds according to parameters in the respective position data.

24. The system of claim 23, the operations further comprising generating a new final scene point cloud that characterizes the transformed scene that has the one or more objects at a later time than the final scene point cloud, comprising:
obtaining a respective velocity and heading of the one or more objects;
determining new position data for the one or more objects from the position data and the respective velocity and headings of the one or more objects;
obtaining a new initial scene point cloud;
generating a second input from the new initial scene point cloud, the one or more object point clouds, and the new position data; and
processing the second input using the first neural network to generate the new final scene point cloud.

25. The system of claim 19, wherein obtaining, for each of one or more objects, an object point cloud that characterizes the object comprises:
obtaining, for each of the one or more objects, original object point clouds; and
transforming the one or more original object point clouds using a second neural network to generate the object point clouds so that the object point clouds are different from the original object point clouds but appear to be drawn from a same data distribution as the original object point clouds.

26. The system of claim 25, the operations further comprising:
processing the one or more object point clouds using a third neural network that predicts whether a given object point cloud is a real object point cloud or a synthetic object point cloud.

27. The system of claim 26, the operations further comprising:
updating a set of parameters of the second neural network based on an error of the third neural network; and
updating a set of parameters of the third neural network based on the error of the third neural network.

28. The system of claim 19, the operations further comprising:
generating the first input by concatenating the initial scene point cloud and the one or more object point clouds.

29. The system of claim 19, wherein processing the first input using a first neural network comprises:
processing the first input using one or more view neural networks, wherein a view neural network extracts features from the first input with respect to a certain point of view; and
combining outputs of the one or more view neural networks to generate an embedding of the first input.

30. The system of claim 29, wherein the one or more view neural networks include a birds-eye view neural that extracts features with respect to a birds-eye view and a perspective view neural network that extracts features with respect to a perspective view.

31. The system of claim 29, the operations further comprising:
processing the embedding of the first input with a fourth neural network to generate the final scene point cloud, wherein the fourth neural network is configured to generate a final scene point cloud that appears as if it were measured by one or more sensors on a vehicle.

32. The system of claim 31, wherein processing the embedding of the first input with a fourth neural network to generate the final scene point cloud comprises:
processing the embedding of the first input to generate a dense scene point cloud; and
generating the final scene point cloud by processing the dense scene point cloud with a point mask that filters out one or more points to adapt the dense scene point cloud to appear as if it were measured by one or more sensors on a vehicle.

33. The system of claim 32, wherein the point mask is machine-learned.

34. The system of claim 19, the operations further comprising:
processing the final scene point cloud using a fifth neural network that predicts whether the final scene point cloud is a real scene point cloud or a synthetic scene point cloud.

35. The system of claim 34, the operations further comprising:

updating a set of parameters of the fifth neural network based on a first error of the fifth neural network; and updating a set of parameters of the first neural network based on the first error of the fifth neural network.

36. The system of claim 35, the operations further comprising:

processing a real scene point cloud, generated from sensor readings of a third environment captured by one or more third sensors, using the fifth neural network;

updating the set of parameters of the fifth neural network based on a second error of the fifth neural network; and updating the set of parameters of the first neural network based on the second error of the fifth neural network.

37. One or more non-transitory computer storage media encoded with computer program instructions that when executed by a plurality of computers cause the plurality of computers to perform operations comprising:

obtaining an initial scene point cloud characterizing an initial scene in an environment;

obtaining, for each of one or more objects, an object point cloud that characterizes the object; and processing a first input comprising the initial scene point cloud and the one or more object point clouds using a first neural network that is configured to process the first input to generate a final scene point cloud that characterizes a transformed scene that has the one or more objects added to the initial scene.

38. The one or more non-transitory computer storage media of claim 37, wherein the initial scene point cloud is generated from sensor readings of the environment captured by one or more first sensors.

39. The one or more non-transitory computer storage media of claim 38, wherein the final scene point cloud characterizes the transformed scene from a point of view of the one or more first sensors.

40. The one or more non-transitory computer storage media of claim 37, wherein obtaining, for each of one or more objects, an object point cloud that characterizes the object comprises:

obtaining initial object point clouds for the one or more objects;

obtaining position data for the one or more objects, the position data of an object identifying a desired realistic location of the object in the initial scene and a desired realistic pose of the object, the pose being an orientation of the object with respect to a certain point of view; and transforming the one or more initial object point clouds using the respective position data to generate the object point clouds.

41. The one or more non-transitory computer storage media of claim 40, wherein transforming the one or more initial object point clouds using the respective position data comprises translating and rotating the initial object point clouds according to parameters in the respective position data.

42. The one or more non-transitory computer storage media of claim 41, the operations further comprising generating a new final scene point cloud that characterizes the transformed scene that has the one or more objects at a later time than the final scene point cloud, comprising:

obtaining a respective velocity and heading of the one or more objects;

determining new position data for the one or more objects from the position data and the respective velocity and headings of the one or more objects;

obtaining a new initial scene point cloud;

generating a second input from the new initial scene point cloud, the one or more object point clouds, and the new position data; and processing the second input using the first neural network to generate the new final scene point cloud.

43. The one or more non-transitory computer storage media of claim 37, wherein obtaining, for each of one or more objects, an object point cloud that characterizes the object comprises:

obtaining, for each of the one or more objects, original object point clouds; and transforming the one or more original object point clouds using a second neural network to generate the object point clouds so that the object point clouds are different from the original object point clouds but appear to be drawn from a same data distribution as the original object point clouds.

44. The one or more non-transitory computer storage media of claim 43, the operations further comprising:

processing the one or more object point clouds using a third neural network that predicts whether a given object point cloud is a real object point cloud or a synthetic object point cloud.

45. The one or more non-transitory computer storage media of claim 44, the operations further comprising:

updating a set of parameters of the second neural network based on an error of the third neural network; and updating a set of parameters of the third neural network based on the error of the third neural network.

46. The one or more non-transitory computer storage media of claim 37, the operations further comprising:

generating the first input by concatenating the initial scene point cloud and the one or more object point clouds.

47. The one or more non-transitory computer storage media of claim 37, wherein processing the first input using a first neural network comprises:

processing the first input using one or more view neural networks, wherein a view neural network extracts features from the first input with respect to a certain point of view; and combining outputs of the one or more view neural networks to generate an embedding of the first input.

48. The one or more non-transitory computer storage media of claim 47, wherein the one or more view neural networks include a birds-eye view neural network that extracts features with respect to a birds-eye view and a perspective view neural network that extracts features with respect to a perspective view.

49. The one or more non-transitory computer storage media of claim 47, the operations further comprising:

processing the embedding of the first input with a fourth neural network to generate the final scene point cloud, wherein the fourth neural network is configured to generate a final scene point cloud that appears as if it were measured by one or more sensors on a vehicle.

50. The one or more non-transitory computer storage media of claim 49, wherein processing the embedding of the first input with a fourth neural network to generate the final scene point cloud comprises:

processing the embedding of the first input to generate a dense scene point cloud; and generating the final scene point cloud by processing the dense scene point cloud with a point mask that filters out one or more points to adapt the dense scene point cloud to appear as if it were measured by one or more sensors on a vehicle.

51. The one or more non-transitory computer storage media of claim 50, wherein the point mask is machine-learned.

52. The one or more non-transitory computer storage media of claim 37, the operations further comprising:
processing the final scene point cloud using a fifth neural network that predicts whether the final scene point cloud is a real scene point cloud or a synthetic scene point cloud.

53. The one or more non-transitory computer storage media of claim 52, the operations further comprising:
updating a set of parameters of the fifth neural network based on a first error of the fifth neural network; and
updating a set of parameters of the first neural network based on the first error of the fifth neural network.

54. The one or more non-transitory computer storage media of claim 53, the operations further comprising:
processing a real scene point cloud, generated from sensor readings of a third environment captured by one or more third sensors, using the fifth neural network;
updating the set of parameters of the fifth neural network based on a second error of the fifth neural network; and
updating the set of parameters of the first neural network based on the second error of the fifth neural network.

* * * * *